(12) United States Patent
Seo et al.

(10) Patent No.: US 12,154,559 B2
(45) Date of Patent: Nov. 26, 2024

(54) SPEECH RECOGNITION DEVICE AND METHOD

(71) Applicant: SAMSUNG ELECTRONICS CO., LTD., Suwon-si (KR)

(72) Inventors: Chanwon Seo, Suwon-si (KR); Yehoon Kim, Suwon-si (KR); Sojung Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/770,243

(22) PCT Filed: Dec. 19, 2018

(86) PCT No.: PCT/KR2018/016219
§ 371 (c)(1),
(2) Date: Jun. 5, 2020

(87) PCT Pub. No.: WO2019/124963
PCT Pub. Date: Jun. 27, 2019

(65) Prior Publication Data
US 2020/0372911 A1    Nov. 26, 2020

(30) Foreign Application Priority Data
Dec. 19, 2017  (KR) .................. 10-2017-0175338

(51) Int. Cl.
*G10L 15/22*    (2006.01)
*G10L 15/20*    (2006.01)
*G10L 15/25*    (2013.01)

(52) U.S. Cl.
CPC .............. *G10L 15/22* (2013.01); *G10L 15/20* (2013.01); *G10L 15/25* (2013.01)

(58) Field of Classification Search
CPC ......... G10L 15/22; G10L 15/20; G10L 15/25; G10L 17/00; G10L 21/0208; G10L 15/04;
(Continued)

(56) References Cited

U.S. PATENT DOCUMENTS 7,136,817 B2    11/2006  Schroder et al.
8,155,968 B2    4/2012   Sugiyama et al.
(Continued)

FOREIGN PATENT DOCUMENTS

CN    1701287      11/2005
CN    102097096    6/2011
(Continued)

OTHER PUBLICATIONS

Search Report dated Apr. 1, 2019 in counterpart International Patent Application No. PCT/KR2018/016219 and English-language machine translation.
(Continued)

*Primary Examiner* — Angela A Armstrong
(74) *Attorney, Agent, or Firm* — Nixon & Vanderhye, P.C.

(57) ABSTRACT

Provided are a speech recognition device and method. The speech recognition device includes a microphone and a processor configured to receive a voice signal through the microphone, generate voice characteristic data by analyzing the voice signal by using a data recognition model based on a neural network, determine whether the voice signal is voice uttered from a user or voice output from an external device based on the voice characteristic data, and when the voice signal is determined as the voice uttered from the user, determine the voice signal as a voice command of the user and perform an operation corresponding to the voice command.

(Continued)

The present disclosure also relates to an artificial intelligence (AI) system utilizing a machine learning algorithm such as deep learning, and applications thereof.

8 Claims, 24 Drawing Sheets

(58) Field of Classification Search
CPC ... G10L 15/16; G10L 15/28; G10L 2015/223; G10L 25/30; G10L 25/51
See application file for complete search history.

(56) References Cited

U.S. PATENT DOCUMENTS

| | | | |
|---|---|---|---|
| 8,645,132 B2 | 2/2014 | Mozer et al. | |
| 9,443,510 B2 | 9/2016 | Jung | |
| 9,484,027 B2 | 11/2016 | Zhao et al. | |
| 9,830,911 B2 | 11/2017 | Lee et al. | |
| 10,186,265 B1* | 1/2019 | Lockhart | G10L 15/32 |
| 10,789,948 B1* | 9/2020 | Klein | G10L 15/30 |
| 11,133,027 B1 | 9/2021 | Hardie et al. | |
| 2004/0133420 A1* | 7/2004 | Ferris | G10L 25/78 |
| | | | 704/215 |
| 2006/0100880 A1 | 5/2006 | Yamamoto et al. | |
| 2011/0231353 A1 | 9/2011 | Wang et al. | |
| 2015/0006176 A1 | 1/2015 | Pogue et al. | |
| 2015/0213797 A1 | 7/2015 | Wang et al. | |
| 2015/0235637 A1 | 8/2015 | Casado et al. | |
| 2015/0331490 A1 | 11/2015 | Yamada | |
| 2016/0111107 A1 | 4/2016 | Erdogan et al. | |
| 2017/0092268 A1 | 3/2017 | Kristjansson | |
| 2018/0033454 A1* | 2/2018 | Hardek | G10L 15/07 |
| 2018/0211653 A1 | 7/2018 | Melendo Casado et al. | |
| 2019/0313014 A1* | 10/2019 | Welbourne | G06V 40/70 |
| 2020/0051546 A1* | 2/2020 | Iwase | G10L 13/047 |

FOREIGN PATENT DOCUMENTS

| | | |
|---|---|---|
| CN | 107144819 A | 9/2017 |
| CN | 107146614 | 9/2017 |
| JP | 2002-182688 | 6/2002 |
| JP | 2002182688 A * | 6/2002 |
| JP | 2009-192942 | 8/2009 |
| JP | 2014-153663 | 8/2014 |
| KR | 10-2008-0041397 | 5/2008 |
| KR | 10-0845476 | 7/2008 |
| KR | 10-2014-0094330 | 7/2014 |
| WO | 2014/010879 | 1/2014 |

OTHER PUBLICATIONS

Written Opinion dated Apr. 1, 2019 in counterpart International Patent Application No. PCT/KR2018/016219 and English-language machine translation.

Wu, Z. et al., "A study on replay attack and anti-spoofing for text-dependent speaker verification," Signal and Information Processing Association Annual Summit and Conference (APSIPA), 2014 Asia-Pacific, Dec. 9-12, 2014, 1 page (Abstract).

Villalba, J. et al., "Preventing replay attacks on speaker verification systems," 2011 Carnahan Conference on Security Technology, Oct. 18-21, 2011, 1 page (Abstract).

Wu, Z. et al., "On the study of replay and voice conversion attacks to text-dependent speaker verification," Multimedia Tools and Applications 75, Dec. 3, 2015, https://doi.org/10.1007/s11042-015-3080-9, 10 pages (Abstract).

ASVspoof 2019 Automatic Speaker Verification Spoofing and Countermeasures Challenge, https://www.asvspoof.org/, 6 pages.

Notice of Non-Final Rejection dated Aug. 26, 2021 in counterpart Korean Patent Application No. 10-2017-0175338 and English-language machine translation.

Notice of Final Rejection dated Feb. 25, 2022 in counterpart Korean Patent Application No. 10-2017-0175338 and English-language translation.

Office Action dated Oct. 12, 2023 in counterpart Chinese Patent Application No. 201880082848.X and English-language translation.

Office Action dated Feb. 23, 2023 in counterpart Chinese Patent Application No. 201880082848.X and English-language translation.

Office Action dated Mar. 21, 2024 in counterpart Chinese Patent Application No. 201880082848.X and English-language translation.

Office Action dated Jun. 29, 2024 in Chinese Patent Application No. 201880082848.X and English-language translation.

* cited by examiner

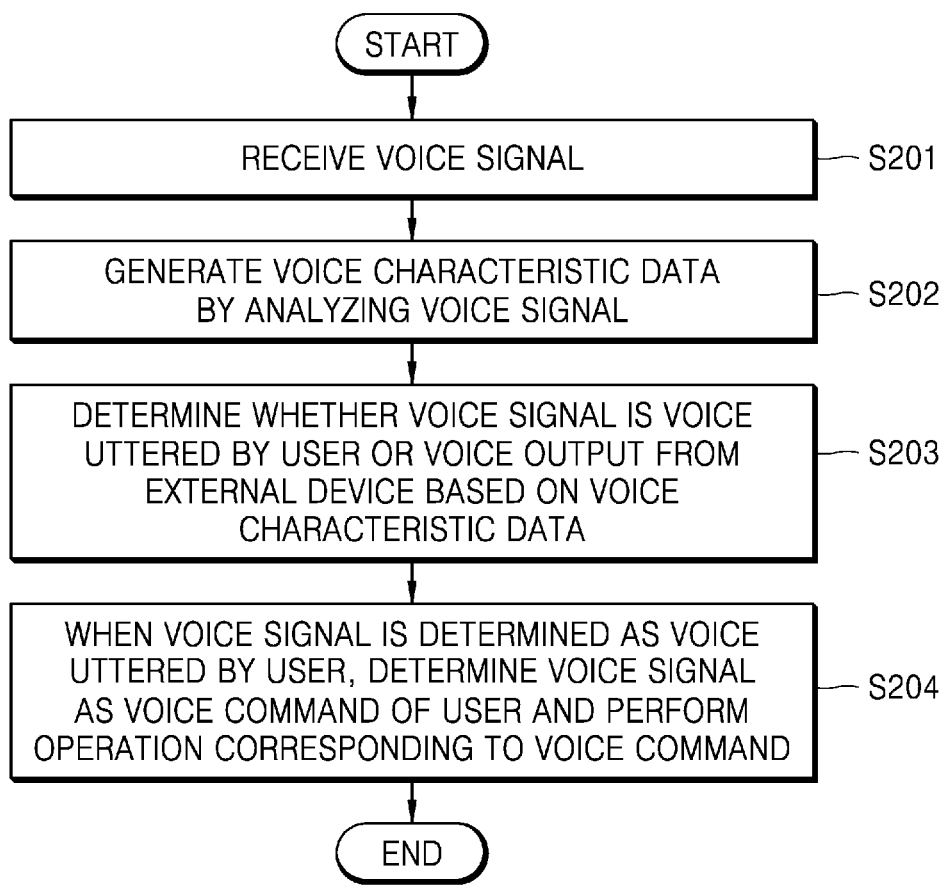

FIG. 12
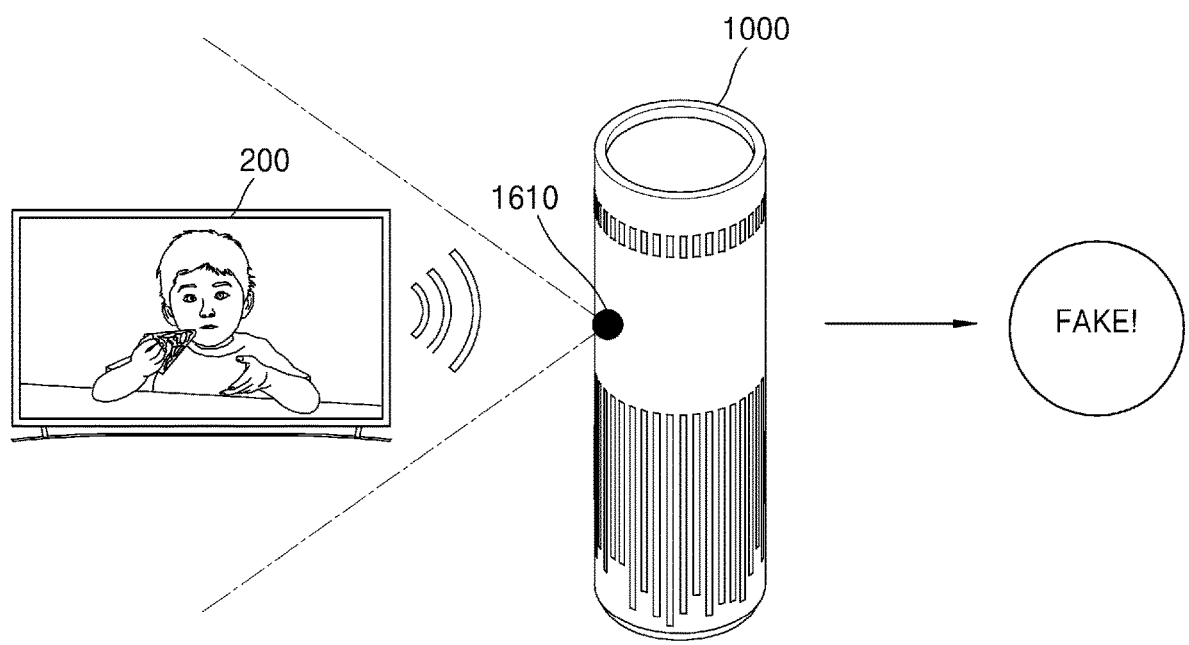
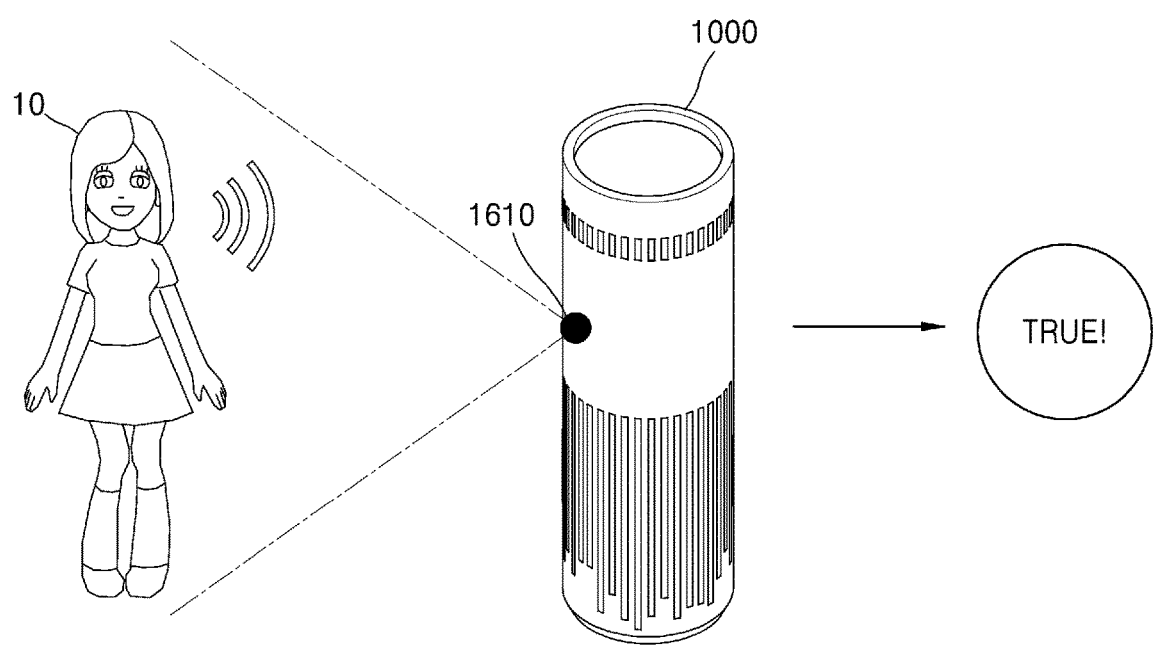

SPEECH RECOGNITION DEVICE AND METHOD

This application is the U.S. national phase of International Application No. PCT/KR2018/016219 filed Dec. 19, 2018 which designated the U.S. and claims priority to KR Patent Application No. 10-2017-175338 filed Dec. 19, 2017, the entire contents of each of which are hereby incorporated by reference.

TECHNICAL FIELD

The present disclosure relates to a voice recognition device and method.

The present disclosure also relates to an artificial intelligence (AI) system utilizing a machine learning algorithm such as deep learning, and applications thereof.

DESCRIPTION OF RELATED ART

Artificial intelligence (AI) system is a computer system that implements human-level intelligence. Unlike existing Rule-based smart systems, AI is a system in which machines learn, judge, and become smart. AI systems are increasingly recognized and improving their understanding of user preferences as they are used, and existing rule-based smart systems are gradually being replaced with deep-learning-based AI systems.

AI technology consists of machine learning (deep learning) and element technologies that utilize machine learning. Machine learning is an algorithm technology that classifies/learns the characteristics of input data by itself. Element technology is a technology that utilizes machine learning algorithms such as deep learning, and consists of technical fields such as linguistic understanding, visual understanding, reasoning/prediction, knowledge representation, and motion control.

The various fields in which AI technology is applied are as follows. Linguistic understanding is a technique for recognizing, applying, and processing human language/characters, and includes natural language processing, machine translation, dialogue system, query response, speech recognition/synthesis, and the like. Visual understanding is a technique for recognizing and processing objects as human vision, and includes object recognition, object tracking, image search, human recognition, scene understanding, spatial understanding, image enhancement, etc. Reasoning/prediction is a technique for judging and logically inferring and predicting information, and includes knowledge/probability-based reasoning, optimization prediction, preference-based planning, and recommendation. Knowledge representation is a technique for automating human experience information into knowledge data, and includes knowledge building (data generation/classification) and knowledge management (data utilization). The motion control is a technique for controlling autonomous travel of a vehicle and motion of a robot, and includes motion control (navigation, collision, traveling), operation control (behavior control), etc.

Recently, in the field of speech recognition, research into a speech recognition device that grasps a user's intention from a user's voice command and provides the user with a desired service has been demanded.

SUMMARY

Provided are a speech recognition device and method. Provided are computer-readable recording media having recorded thereon a program, which, when executed by a computer, performs the above method. The technical goal of the disclosure is not limited thereto, and other technical goals may exist.

According to an aspect of the disclosure, a speech recognition device includes a microphone, and a processor configured to receive a voice signal through the microphone, generate voice characteristic data by analyzing the voice signal by using a data recognition model based on a neural network, determine whether the voice signal is voice uttered from a user or voice output from an external device based on the voice characteristic data, and when the voice signal is determined as the voice uttered from the user, determine the voice signal as a voice command of the user and perform an operation corresponding to the voice command.

BRIEF DESCRIPTION OF THE DRAWINGS

FIG. 2 is a flowchart illustrating a method of operating a speech recognition device, according to an embodiment.

FIG. 12 is a diagram illustrating an example of distinguishing a user's voice from a voice of an external device by using a peripheral image, according to an embodiment.

DETAILED DESCRIPTION OF EXAMPLE EMBODIMENTS

Figure 1:
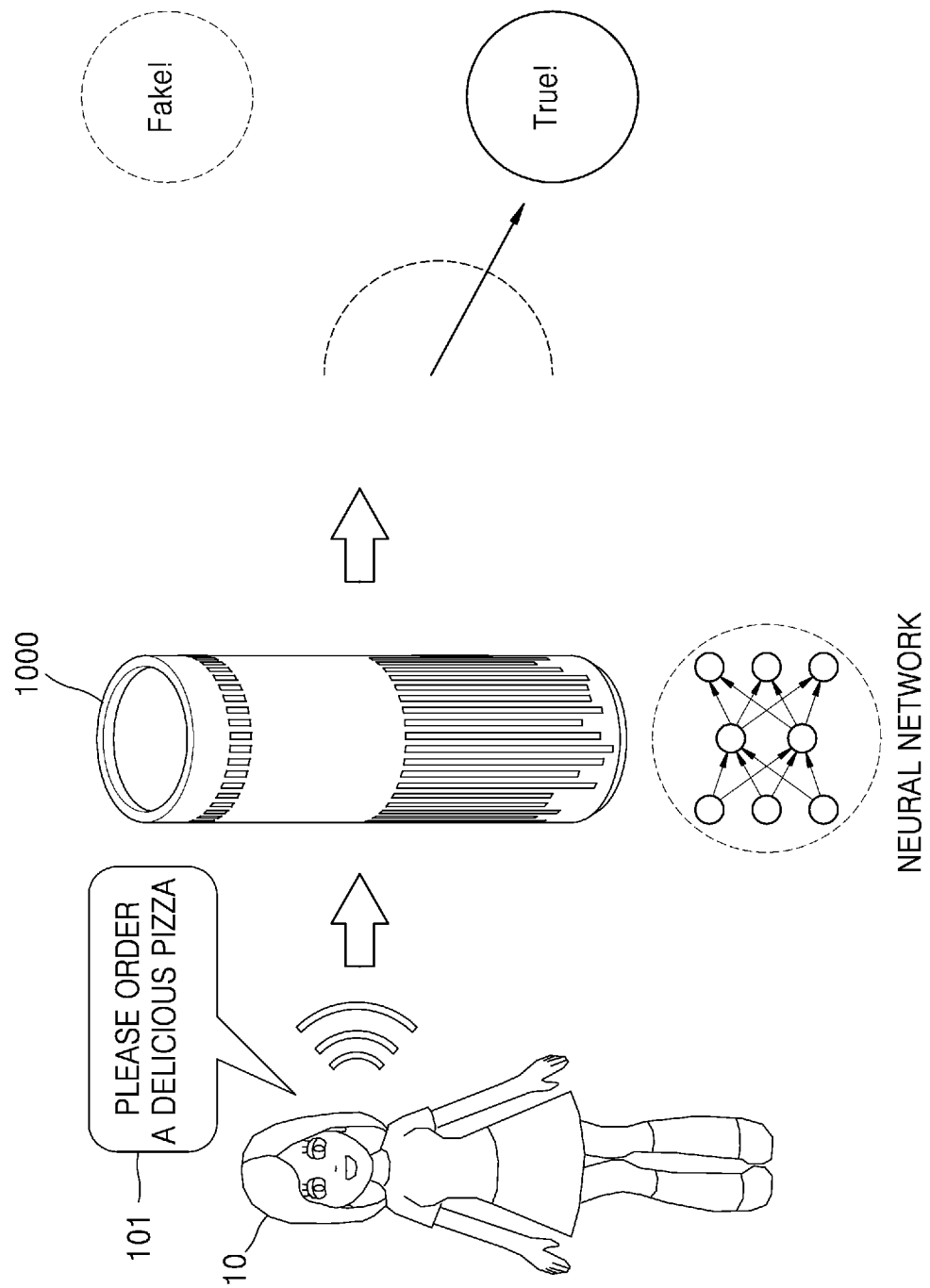
FIG. 1 is a diagram showing an example of operating a speech recognition device according to an embodiment.

According to an aspect of the present disclosure, a speech recognition device includes a microphone, and a processor configured to receive a voice signal through the microphone, generate voice characteristic data by analyzing the voice signal by using a data recognition model based on a neural network, determine whether the voice signal is voice uttered from a user or voice output from an external device based on the voice characteristic data, and when the voice signal is determined as the voice uttered from the user, determine the voice signal as a voice command of the user and perform an operation corresponding to the voice command.

According to another aspect of the present disclosure, an operation method of a speech recognition device includes receiving a voice signal through a microphone, generating voice characteristic data by analyzing the voice signal by using a data recognition model based on a neural network, determining whether the voice signal is voice uttered from a user or voice output from an external device based on the voice characteristic data, by using the data recognition model, and when the voice signal is determined as the voice uttered from the user, determining the voice signal as a voice command of the user and performing an operation corresponding to the voice command.

According to another aspect of the present disclosure, there is provided a computer-readable recording medium having recorded thereon a program for performing the method.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be further understood that the terms "comprises" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

Hereinafter, one or more embodiments of the present disclosure will be described in detail with reference to accompanying drawings to the extent that one of ordinary skill in the art would be able to carry out the present disclosure. However, the present disclosure may be implemented in various manners, and is not limited to one or more embodiments described herein.

Hereinafter, embodiments of the present disclosure will be described in detail with reference to the drawings.

FIG. 1 is a diagram showing an example of operating a speech recognition device according to an embodiment.

According to an embodiment, a speech recognition device 1000 (see FIGS. 16 and 17, hereinafter, referred to as a speech recognition device 1000) is a device capable of recognizing a voice command from a user. The speech recognition device 1000 according to the embodiment may include a voice recognition speaker capable of performing a function corresponding to a recognized voice command of a user, but is not limited thereto. For example, the speech recognition device 1000 may provide, but is not limited to, answers to questions of the user (e.g., the weather, schedule management, etc.) and may provide a service for ordering and paying for a product by accessing a web server. Also, the speech recognition device 1000 may be connected to other devices to perform a function of controlling the other devices (e.g., controlling electronic appliances, etc.).

Referring to FIG. 1, when receiving a voice input (e.g., "please order a delicious pizza" 101) from a user 10, the speech recognition device 1000 according to the embodiment may determine whether a voice input signal is voice directly uttered from the user 10.

In an embodiment, in order to determine whether the received voice signal is directly uttered from the user 10 within a predetermined distance from the speech recognition device 1000 or output from another external device (e.g., a sound output device such as a TV, a radio, etc.) (not shown, hereinafter referred to as an external device or a sound output device), the speech recognition device 1000 may use one or more data recognition models that are trained to be applied to the voice signal analysis.

According to an embodiment, the speech recognition device 1000 may use a data recognition model based on a neural network such as a deep neural network (DNN), a recurrent neural network (RNN), etc.

The speech recognition device 1000 analyzes the voice signal input through a microphone 1620 (see FIGS. 16 and 17; hereinafter, referred to as a microphone 1620) by using one or more data recognition models based on the neural network to generate voice characteristic data, and then, may determine whether the voice signal is uttered from the user or output from an external device based on the voice characteristic data.

According to an embodiment, the voice characteristic data may include information that is generated by analyzing voice signal characteristics such as a waveform, a frequency, an amplitude, etc. of the voice signal. For example, the voice characteristic data may include analysis information about whether the voice signal is an analog signal, a digital signal, or a reconstructed signal from a compressed signal, wherein the voice signal includes electrical noise, etc.

The voice characteristic data will be described in more detail later with reference to FIGS. 5 to 10.

According to an embodiment, when it is determined that the received voice signal is not a voice command directly uttered by the user, but a voice signal output from another sound output device (not shown), the speech recognition device 1000 may filter the received voice signal to classify the voice signal not as a voice command.

According to an embodiment, even when the speech recognition device 1000 receives a human voice signal (e.g., user voice output from a TV, recorded user voice output from a mobile phone, etc.) output from another sound output device (not shown), the speech recognition device 1000 may not misunderstand the voice signal as a voice command for the speech recognition device 1000, and thus, a situation in which the speech recognition device 1000 unnecessarily performs an operation not intended by the user may be prevented.

FIG. 1 shows an embodiment, and is not limited to the embodiment.

In FIG. 1, the speech recognition device 1000 is shown as a voice recognition speaker as an example, but is not limited thereto.

The speech recognition device 1000 according to the embodiment may be implemented as an electronic device performing a voice recognition function. For example, the speech recognition device 1000 may be implemented as various electronic devices, e.g., a smart TV, a set-top box, a mobile phone, a tablet PC, a digital camera, a laptop computer, a desktop computer, an E-book terminal, a digital broadcasting terminal, a personal digital assistant (PDA), a portable multimedia player (PMP), a navigation device, an MP3 player, a wearable device, etc.

FIG. 2 is a flowchart illustrating a method of operating the speech recognition device according to an embodiment.

In operation S201 of FIG. 2, the speech recognition device 1000 may receive a voice signal.

According to an embodiment, the speech recognition device 1000 may receive the voice signal through the microphone 1620 (see FIGS. 16 and 17; hereinafter, referred to as the microphone 1620). According to an embodiment, a processor 1300 (see FIGS. 16 and 17; hereinafter, referred to as a processor 1300) of the speech recognition device 1000 executes an application for voice recognition and may receive the voice input through the microphone 1620 by controlling the application.

In operation S202, the speech recognition device 1000 may generate voice characteristic data by analyzing the voice signal.

Voice uttered by the user and voice output from a sound output device (e.g., a TV, a radio, etc.) may have different voice signal characteristics such as a waveform, a frequency, etc. of the voice signal. For example, the voice signal uttered by the user may be an analog signal, and the voice signal output from the sound output device may be a reconstructed signal of a compressed digital signal. Also, unlike the voice signal uttered by the user, the voice signal output from the sound output device may include electrical noise.

According to an embodiment, the speech recognition device 1000 may use a data recognition model based on the neural network, in order to analyze the voice signal and generate the voice characteristic data.

According to an embodiment, the speech recognition device 1000 may generate the voice characteristic data including information that is obtained by analyzing the waveform, the frequency, etc. of the input voice signal by using one or more data recognition models. For example, the voice characteristic data may include information about whether the voice signal is an analog signal, a digital signal, or a reconstructed signal from a compressed signal.

In operation S203, the speech recognition device 1000 may determine whether the voice signal is uttered by the user or output from an external device, based on the voice characteristic data.

According to the embodiment, the speech recognition device 1000 may use the data recognition model based on the neural network in order to determine whether the voice signal is the voice uttered by the user or the voice output from an external device based on the voice characteristic data.

For example, the speech recognition device 1000 may determine that the voice signal is the voice directly uttered by the user, not the voice output from the external device, based on the voice characteristic data including information representing that the voice signal is an analog signal and does not include electrical noise by analyzing the voice signal by using the one or more data recognition models.

In operation S204, the speech recognition device 1000 may determine the voice signal as a voice command of the user and perform an operation corresponding to the voice command, because the voice signal is determined as the voice uttered by the user.

According to an embodiment, the speech recognition device 1000 may determine the voice signal as the voice command of the user and may perform the function corresponding to the voice command of the user by determining the meaning of the voice command and intention of the user.

According to an embodiment, the speech recognition device 1000 may perform the operation according to the intention of the user by analyzing the voice command of the user by using a data recognition model based on the neural network. For example, as shown in FIG. 1, according to the voice command of the user ("Please order a delicious pizza" 101), the speech recognition device 1000 may access a web site for ordering a pizza, determine the kind of pizza according to the preference of the user, and perform ordering and paying operations.

According to an embodiment, because the speech recognition device 1000 performs the operation according to the voice command when it is determined that the voice signal is the voice uttered directly by the user by analyzing the voice signal, a risk of misunderstanding the voice output from the external device as the voice command may be avoided. According to an embodiment, a situation in which the speech recognition device unnecessarily performs the operation not intended by the user may be prevented.

FIGS. 1 and 2 show an embodiment of the present disclosure, and are not limited thereto.

Figure 3A:
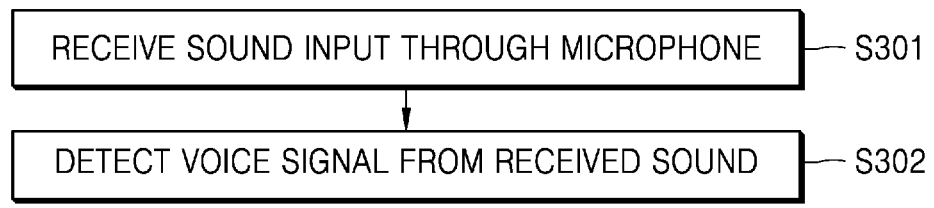
FIG. 3A is a flowchart illustrating an example of detecting a voice signal, according to an embodiment.
Figure 3B:
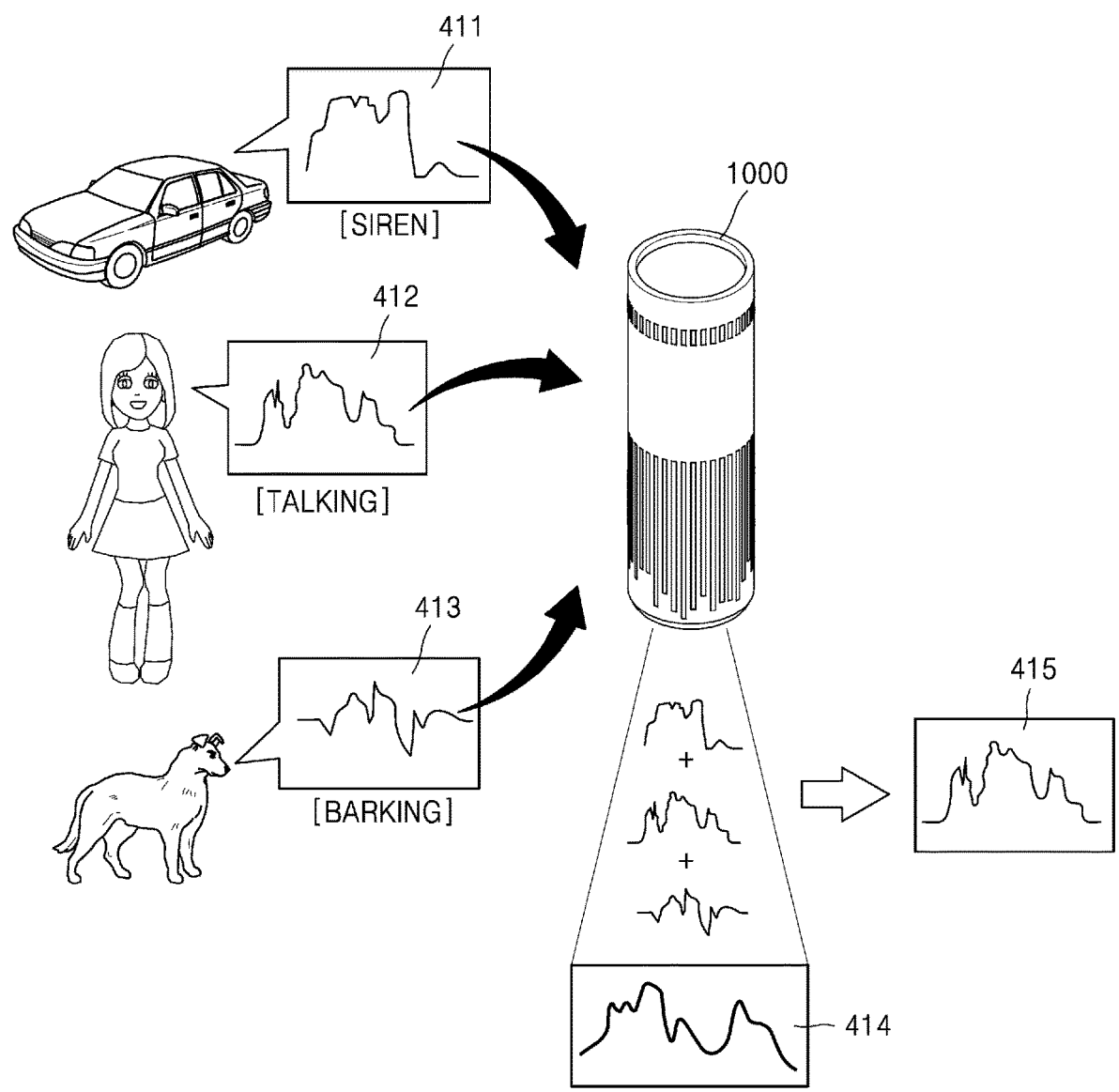
FIG. 3B is a diagram illustrating an example of detecting a voice signal, according to an embodiment.

FIG. 3A is a flowchart illustrating an example of detecting a voice signal, according to an embodiment. FIG. 3B is a diagram illustrating an example of detecting a voice signal, according to an embodiment. The flowchart of FIG. 3A will be described with reference to FIG. 3B.

In operation S301 of FIG. 3A, the speech recognition device 1000 may receive sound input through the microphone 1620.

According to an embodiment, the sound input through the microphone 1620 may include ambient noise, as well as a human voice.

Referring to FIG. 3B, for example, the microphone 1620 of the speech recognition device 1000 may receive the sound including a vehicle driving or honk sound 411, a human voice sound 412, an animal sound 413, etc. Each of the sounds generated from different sound sources may have different waveforms from one another.

According to an embodiment, when the microphone 1620 of the speech recognition device 1000 operates, the sound input through the microphone 1620 may be recognized as a combined voice signal 414.

In operation S320 of FIG. 3A, the speech recognition device 1000 may detect a voice signal from the received sound.

Referring to FIG. 3B, for example, the speech recognition device 1000 may detect a human voice sound 415 from the combined voice signal 414. According to an embodiment, the speech recognition device 1000 may only detect the human voice signal from the received voice signal, by using one or more data recognition models applied to voice signal analysis.

According to an embodiment, the speech recognition device 1000 may distinguish the human voice from noise by analyzing frequency characteristics and relative energy of the human voice and noise. The speech recognition device 1000 may partition the input sound into very small time units and may analyze how the frequency or energy of the sound is changed in each frame. For example, a zero-crossing rate (ZCR) may be used to distinguish the voice from the noise. For each frame that is obtained by dividing the sound in units of time, it is calculated how often the sound passes through a zero point, and an energy value at that time may be calculated to understand the characteristics of the sound.

Figure 4A:
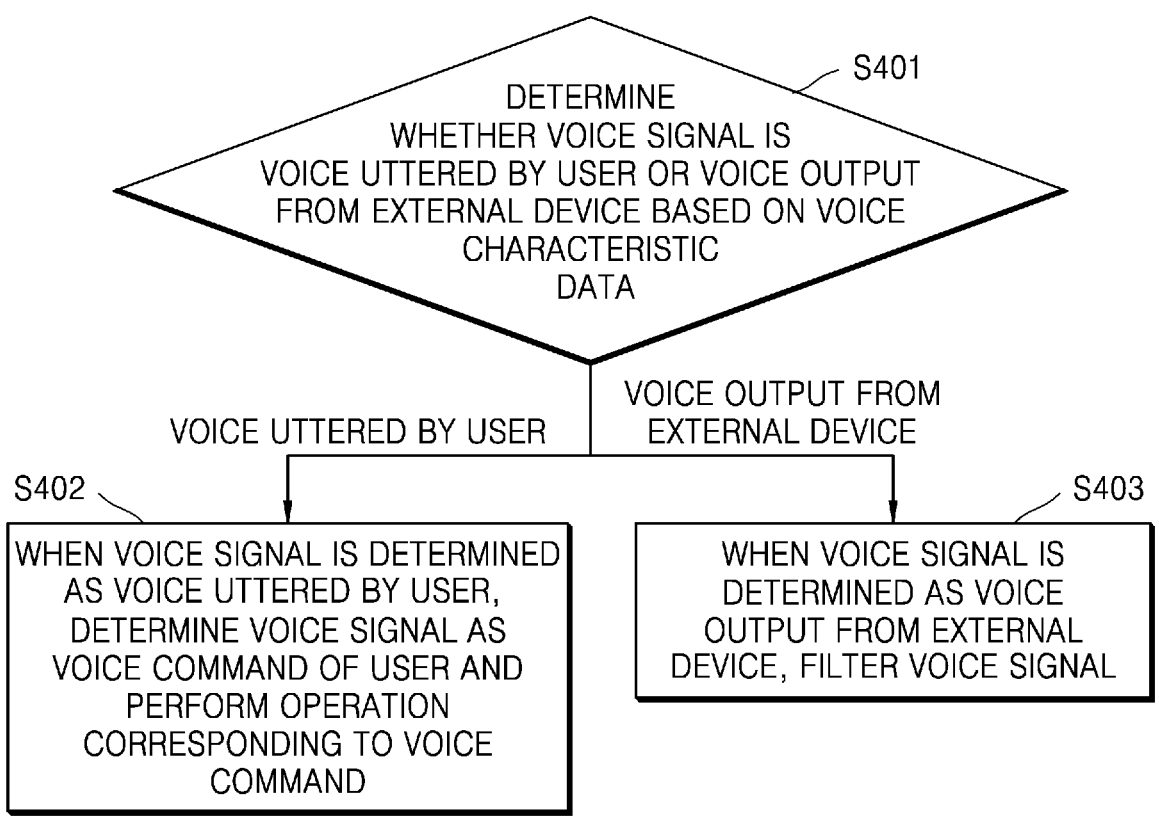
FIG. 4A is a flowchart illustrating an example of distinguishing a user's voice from a voice of an external device, according to an embodiment.
Figure 4B:
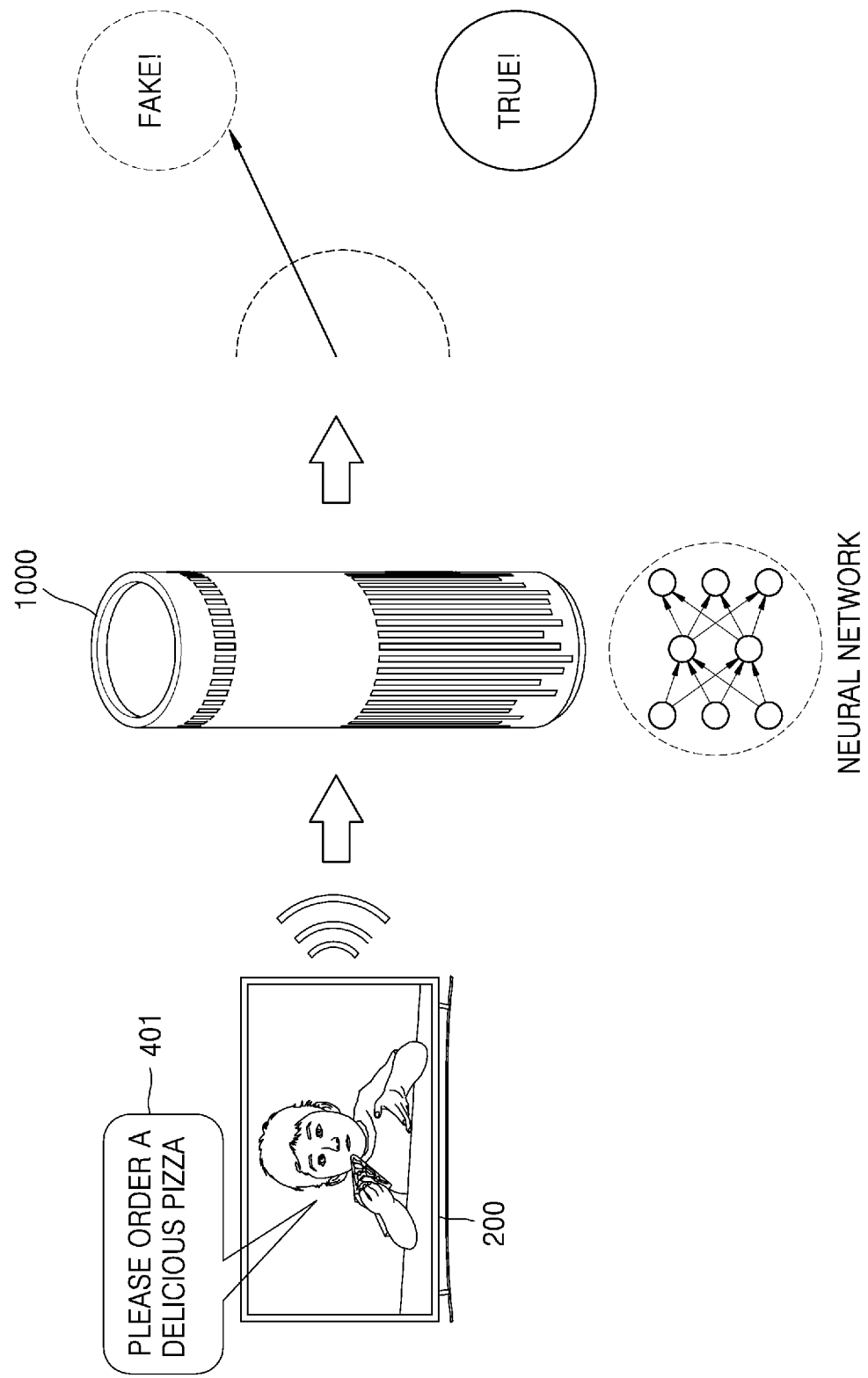
FIG. 4B is a diagram illustrating an example of filtering a voice of an external device by a speech recognition device according to an embodiment.

FIG. 4A is a flowchart illustrating an example of distinguishing a user's voice from a voice of an external device, according to an embodiment. FIG. 4B is a diagram illustrating an example of filtering a voice of an external device by a speech recognition device according to an embodiment. The flowchart of FIG. 4A will be described with reference to FIG. 4B.

In operation S401 of FIG. 4A, the speech recognition device 1000 may determine whether the voice signal is uttered by the user or output from an external device, based on the voice characteristic data.

In operation S402, the speech recognition device 1000 may determine the voice signal as a voice command of the user and perform an operation corresponding to the voice command, because the voice signal is determined as the voice uttered by the user.

Because operations S401 and S402 are the same as above operations S203 and S204 of FIG. 2, descriptions thereof are omitted.

In operation S403, the speech recognition device 1000 may filter the voice signal, when the voice signal is determined as the voice output from the external device.

According to an embodiment, when the received voice signal is not the voice uttered directly by the user, but the voice output from a peripheral sound output device (e.g., a TV, a radio, a smartphone, etc.), the speech recognition device 1000 determines that the voice signal is not the voice command from the user and filters the voice signal. The speech recognition device 1000 does not analyze the meaning of the voice command and does not perform the operation according to the voice command, with respect to the filtered voice signal.

Referring to FIG. 4B, for example, because it is determined that the received voice signal ("please order a delicious pizza" 401) is not the voice uttered by the user, but the voice signal output from an external device 200 (hereinafter, referred to as the external device 200 or the sound output device 200), the speech recognition device 1000 may not analyze the meaning of the voice signal and may not perform an additional operation.

According to an embodiment, a situation in which the speech recognition device unnecessarily performs the operation not intended by the user may be prevented.

Figure 4C:
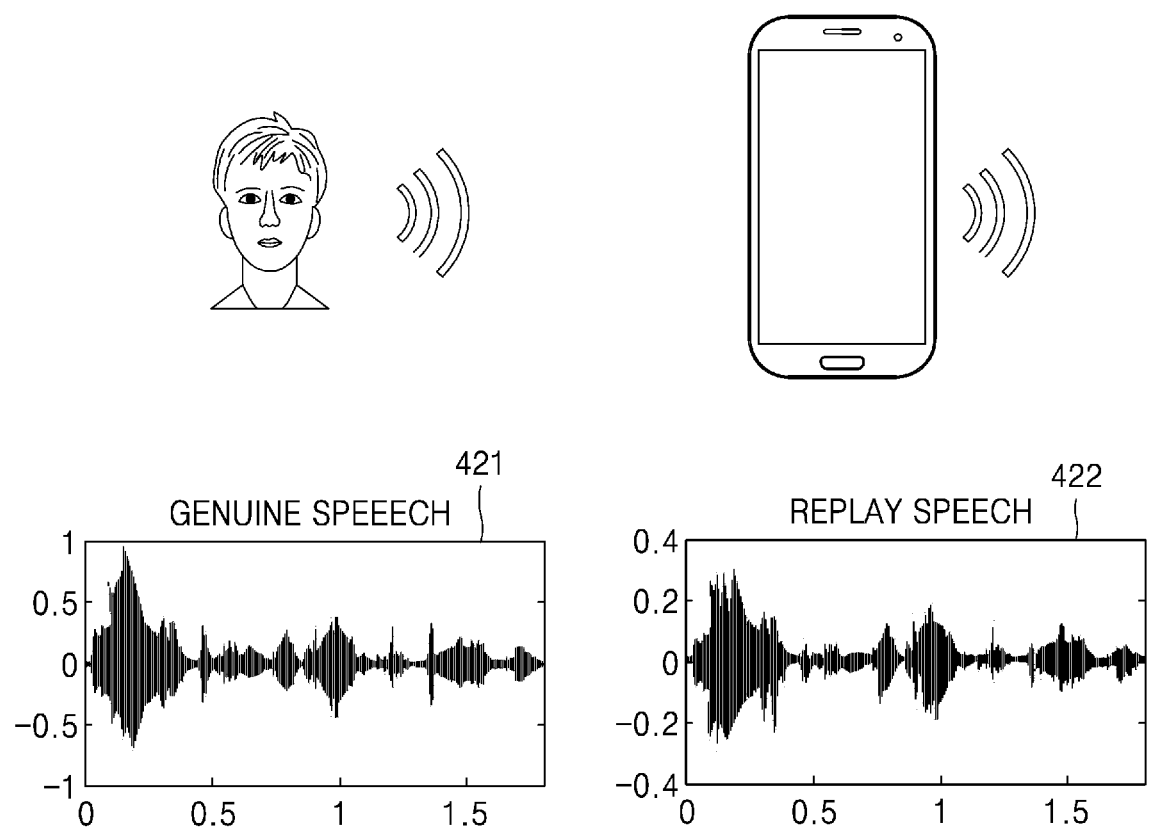
FIG. 4C is a diagram illustrating an example of distinguishing an uttered voice of a user from a reproduction of a recorded voice of the user, according to an embodiment.

FIG. 4C is a diagram illustrating an example of distinguishing an uttered voice of a user from a reproduction of a recorded voice of the user, according to an embodiment.

According to an embodiment, even when the voice is from one user, a sound 421 uttered directly from the user and a sound 422 that is a recorded voice reproduced from the sound output device (e.g. a mobile phone, etc.) may have different waveforms, amplitudes, and frequencies of voice signals.

According to an embodiment, the speech recognition device 1000 may identify whether the input sound is the sound directly uttered from the user or the reproduced sound of a recorded voice of the user, by partitioning the input sound in units of very small time and analyzing the frequency characteristics of the voice signal for each frame.

According to an embodiment, the speech recognition device 1000 may identify whether the received voice signal is the sound uttered directly from the user or the reproduced sound of the recorded voice of the user, by using one or more data recognition models applied to the voice signal analysis.

FIGS. 3A to 4C illustrate an embodiment, and are not limited thereto.

Figure 5:
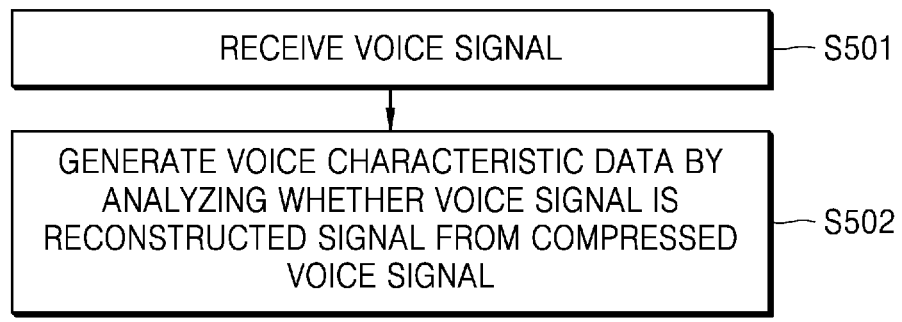
FIG. 5 is a flowchart illustrating an example of generating voice characteristic data according to an embodiment.
Figure 6:
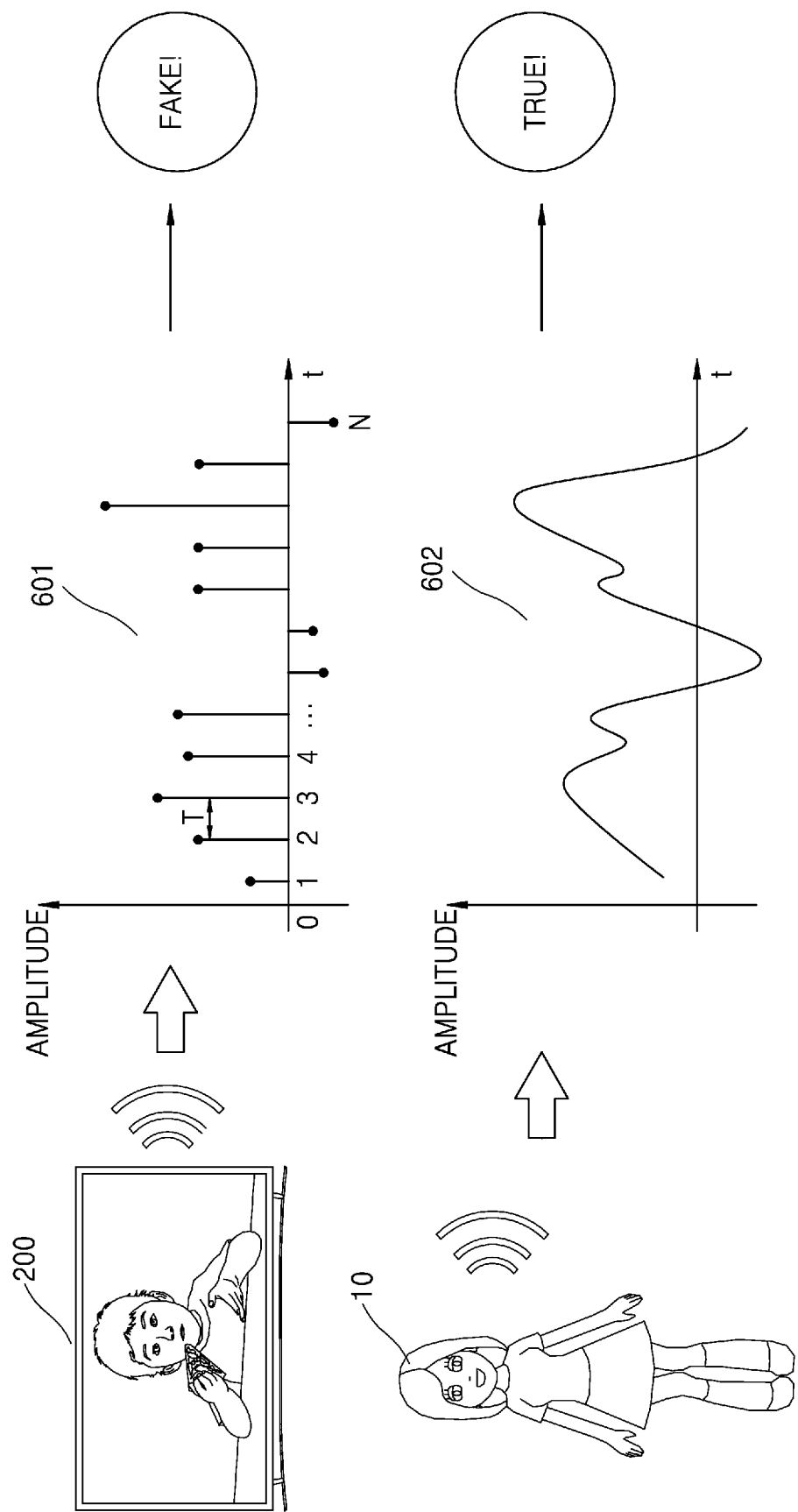
FIG. 6 is a diagram illustrating an example of generating voice characteristic data according to an embodiment.

FIG. 5 is a flowchart illustrating an example of generating voice characteristic data according to an embodiment. FIG. 6 is a diagram illustrating an example of generating voice characteristic data according to an embodiment. The flowchart of FIG. 5 will be described with reference to FIG. 6.

In operation S501 of FIG. 5, the speech recognition device 1000 may receive a voice signal.

Because operation S501 is the same as above operation S201 of FIG. 2, descriptions thereof are omitted.

Also, as described above with reference to operations S301 and S302 of FIG. 3, the speech recognition device 1000 may perform an operation of detecting a voice signal from the sound input through the microphone 1620.

In operation S502, the speech recognition device 1000 may generate voice characteristic data by analyzing whether the voice signal is reconstructed from a compressed voice signal.

The voice signal output from the sound output device 200 may include a voice signal output when the sound output device 200 reproduces a voice file stored in a memory of the sound output device or reproduces a voice file received from another device or a server, or a voice signal included in a broadcast signal received through a broadcast receiver 1530 (see FIG. 17), but is not limited thereto.

The voice signal output from the sound output device 200 according to an embodiment may include a signal obtained by reconstructing a compressed signal by using a code excited linear prediction (CELP). Also, the voice signal output from the sound output device 200 may include, for example, a reconstructed signal obtained by reconstructing a compressed signal by using a codec such as MP3, AC3, advanced audio coding (AAC), etc. There may be signal loss during the processes of compressing and reconstructing the voice signal. For example, there may be signal loss in a frequency band that a human being may not hear.

The speech recognition device 1000 may generate voice characteristic data including information obtained by analyzing whether the voice signal is reconstructed from a compressed voice signal.

Referring to FIG. 6, for example, the speech recognition device 1000 may identify whether the voice signal is a compressed digital signal 601 or an analog signal 602 that is not compressed by analyzing the frequency, the waveform, etc. of the voice signal.

According to an embodiment, when it is determined that the voice signal is an analog signal that is not compressed, the speech recognition device 1000 may determine that the voice signal is a voice uttered directly from the user. Alternatively, the speech recognition device 1000 may determine that the voice signal is likely to be a voice signal uttered from the user.

According to an embodiment, the speech recognition device 1000 may generate the voice characteristic data by determining whether the voice signal is compressed or a probability of whether the voice signal is compressed, by using a data recognition model based on the neural network. Also, the speech recognition device 1000 may determine, based on the voice characteristic data, whether the voice signal is the voice uttered from the user or the voice output from the sound output device 200 by using the data recognition model.

In addition, the speech recognition device 1000 may determine whether the voice signal is the voice uttered from the user or the voice output from the external device, taking into account at least one piece of information included in the voice characteristic data that is generated according to the voice signal analysis illustrated with reference to FIGS. 8 to 15 that will be described later.

FIGS. 5 and 6 show an embodiment of the present disclosure, and are not limited thereto.

Figure 7:
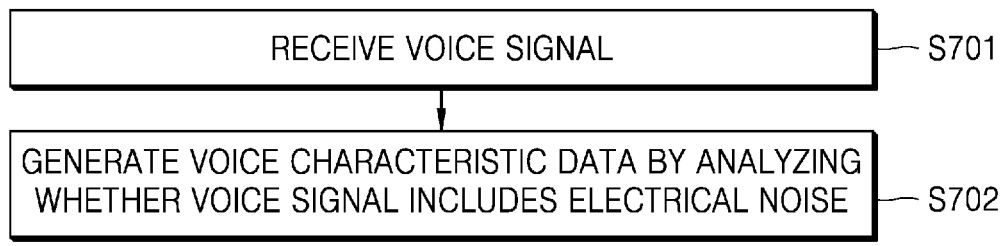
FIG. 7 is a flowchart illustrating an example of generating voice characteristic data according to another embodiment.
Figure 8:
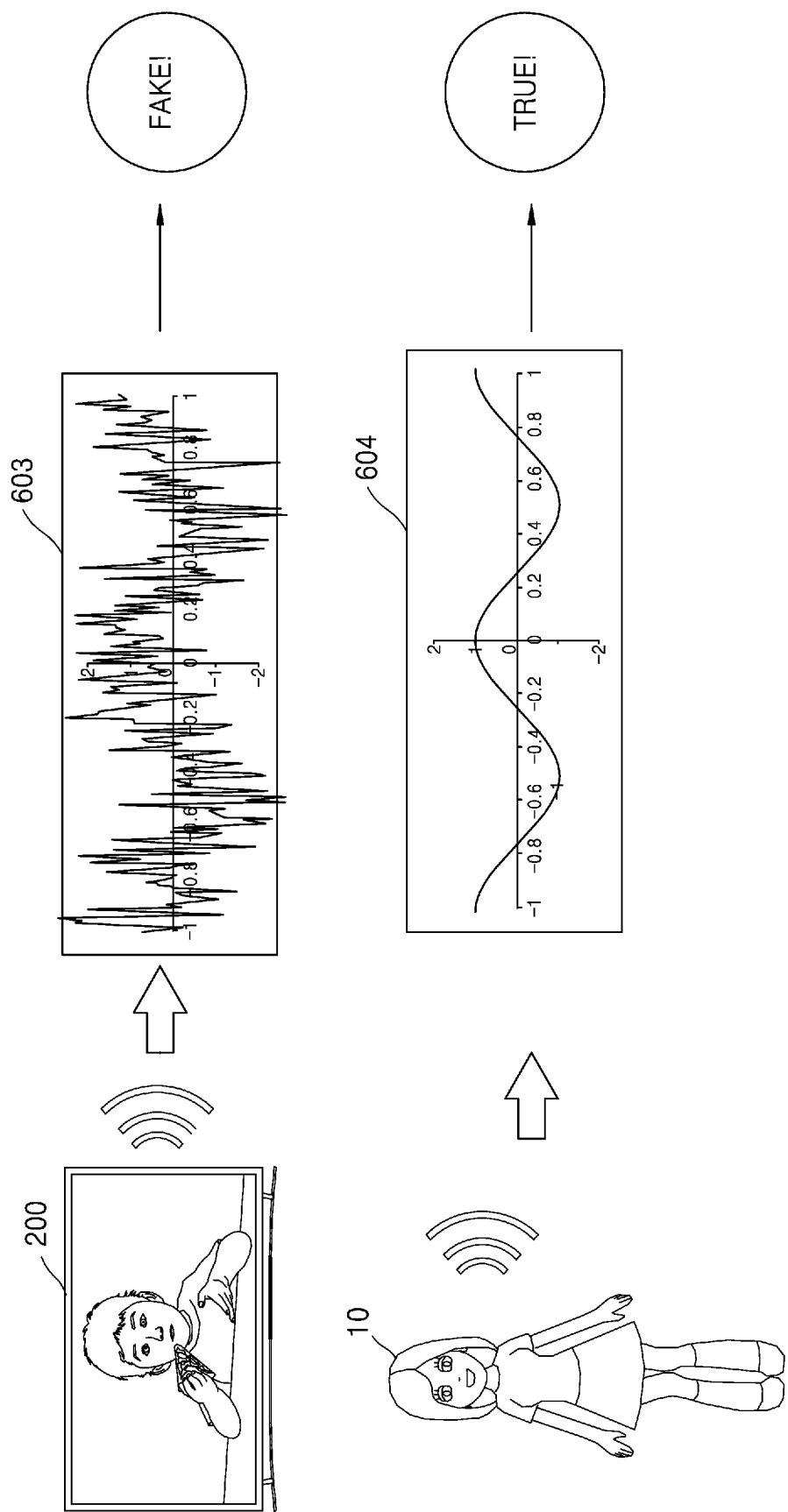
FIG. 8 is a diagram illustrating an example of generating voice characteristic data according to another embodiment.

FIG. 7 is a flowchart illustrating an example of generating voice characteristic data according to another embodiment. FIG. 8 is a diagram illustrating an example of generating voice characteristic data according to another embodiment. The flowchart of FIG. 7 will be described with reference to FIG. 8.

In operation S701 of FIG. 7, the speech recognition device 1000 may receive a voice signal.

Because operation S701 is the same as above operation S201 of FIG. 2, descriptions thereof are omitted.

Also, as described above with reference to operations S301 and S302 of FIG. 3, the speech recognition device 1000 may perform an operation of detecting a voice signal from the sound input through the microphone 1620.

In operation S702, the speech recognition device 1000 may generate the voice characteristic data by analyzing whether electrical noise is included in the voice signal.

The voice signal (e.g., a voice signal of a voice file on which the voice of the user is recorded) output from the sound output device 200 (e.g., a smartphone, etc.) may include electrical noise.

Referring to FIG. 8, for example, the speech recognition device 1000 may determine whether the voice signal includes electrical noise (603) or the voice signal does not include electrical noise (604) by analyzing the waveform, frequency, etc. of the voice signal. The speech recognition device 1000 may generate the voice characteristic data including information of analyzing whether the electrical noise is included in the voice signal.

According to an embodiment, the speech recognition device 1000 may generate the voice characteristic data by determining whether the voice signal includes the electrical noise or a probability of whether the voice signal includes the electrical noise, by using a data recognition model based on the neural network. Also, the speech recognition device 1000 may determine, based on the voice characteristic data, whether the voice signal is the voice uttered from the user or the voice output from the sound output device 200 by using the data recognition model.

In addition, the speech recognition device 1000 may determine whether the voice signal is the voice uttered from the user or the voice output from the external device, taking into account at least one piece of information included in the voice characteristic data that is generated according to the voice signal analysis illustrated with reference to FIGS. 5 to 7 and FIGS. 10 to 15 that will be described later.

FIGS. 7 and 8 show an embodiment of the present disclosure, and are not limited thereto.

Figure 9:
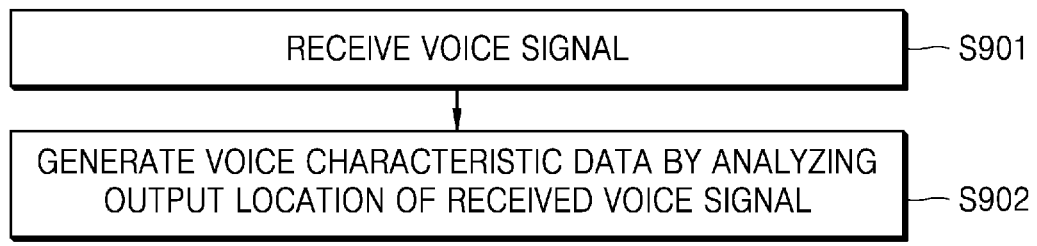
FIG. 9 is a flowchart illustrating an example of generating voice characteristic data according to another embodiment.
Figure 10:
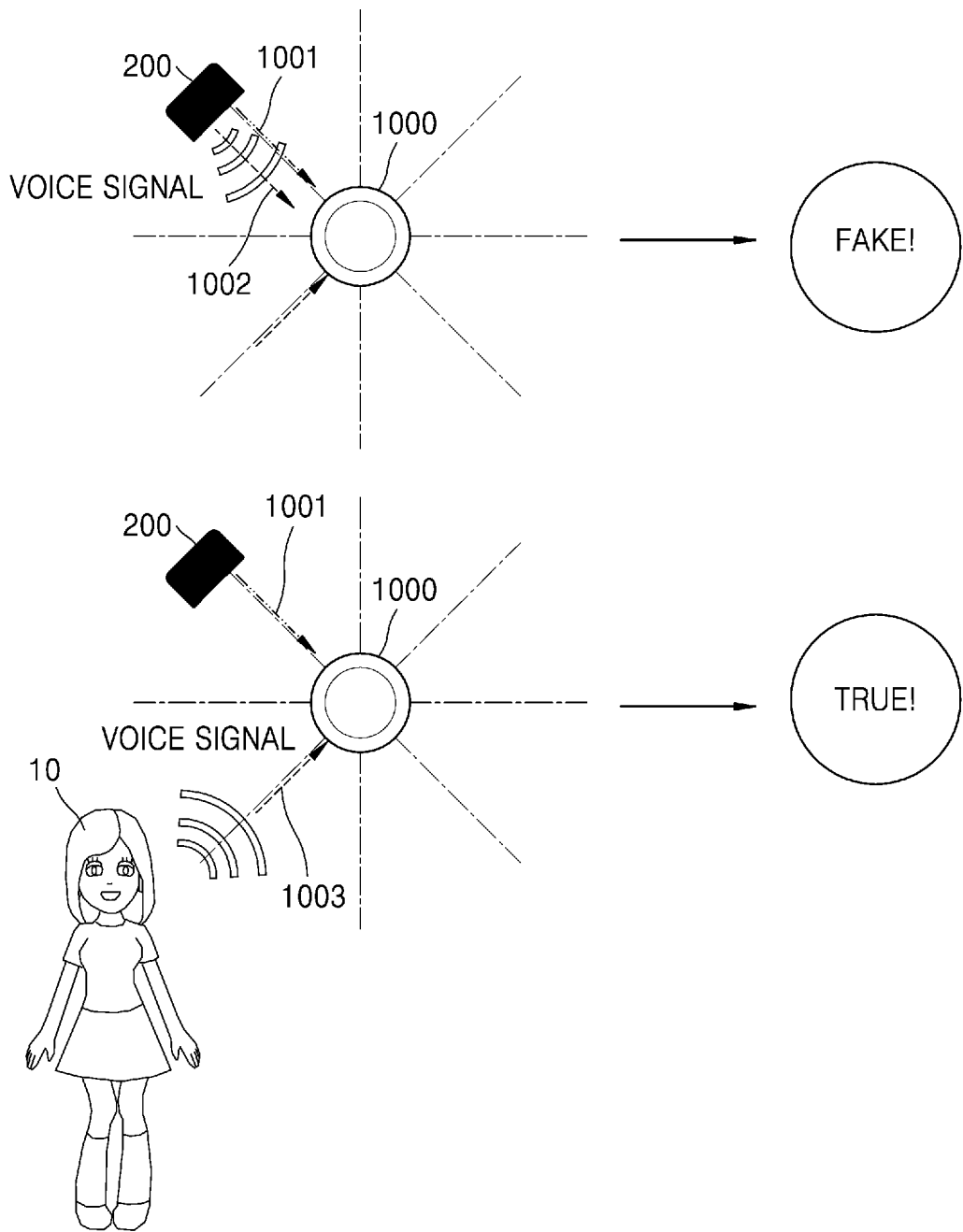
FIG. 10 is a diagram illustrating an example of generating voice characteristic data according to another embodiment.

FIG. 9 is a flowchart illustrating an example of generating voice characteristic data according to another embodiment. FIG. 10 is a diagram illustrating an example of generating voice characteristic data according to another embodiment. The flowchart of FIG. 9 will be described with reference to FIG. 10.

In operation S901 of FIG. 9, the speech recognition device 1000 may receive a voice signal.

Because operation S901 is the same as above operation S201 of FIG. 2, descriptions thereof are omitted.

Also, as described above with reference to operations S301 and S302 of FIG. 3, the speech recognition device 1000 may perform an operation of detecting a voice signal from the sound input through the microphone 1620.

In operation S902, the speech recognition device 1000 may generate voice characteristic data by analyzing an output location of the voice signal.

According to an embodiment, the speech recognition device 1000 may set in advance at least one output location of the voice signal output from the external device.

For example, referring to FIG. 10, the sound output device 200 may be controlled to output the voice signal in order to set a voice output location of the sound output device 200 in advance. The speech recognition device 1000 may receive the voice signal through the microphone 1620 (see FIG. 17), and then may determine a location and a direction of outputting the voice signal. For example, the speech recognition device 1000 may set an output location 1001 of the voice signal output from the external device 200.

According to an embodiment, the speech recognition device 1000 may generate the voice characteristic data including information of determining whether the output location of the received voice signal corresponds to the output location set in advance.

For example, referring to FIG. 10, when receiving the voice signal, the speech recognition device 1000 determines the output location of the voice signal, and determines whether output locations 1002 and 1003 of the voice signal correspond to an output location 1001 set in advance.

According to an embodiment, the speech recognition device 1000 may generate the voice characteristic data by determining whether the output locations 1002 and 1003 of the voice signal correspond to the output location 1001 set in advance of the external device or are close to the output location 1001 within a predetermined range.

When it is determined that the output location 1003 of the voice signal is out of a predetermined range from the output location 1001 of the external device set in advance, the speech recognition device 1000 may determine that the voice signal is the voice directly uttered from the user. Alternatively, the speech recognition device 1000 may determine that the voice signal is likely to be a voice signal uttered from the user.

In addition, when the output location 1002 of the voice signal is determined to be close to the output location 1001 of the external device set in advance within a predetermined range, the speech recognition device 1000 may determine that the voice signal is output from a sound output device 200 set in advance. Alternatively, the speech recognition device 1000 may determine that the voice signal is highly likely to be the voice signal output from the sound output device 200.

In addition, according to an embodiment, the speech recognition device 1000 may generate the voice characteristic data by determining the number of output locations that output the voice signal.

When the sound output device is connected to a plurality of external speakers to output the voice signal through the plurality of external speakers, the sound may be output from various directions.

For example, when it is determined that there are a plurality of output locations from which the voice signal is output, the speech recognition device 1000 may determine that the voice signal is likely to be the voice signal output from the external device.

According to an embodiment, the speech recognition device 1000 may generate the voice characteristic data by determining the output location of the voice signal, the number of output locations, etc., by using the data recognition model based on the neural network. Also, the speech recognition device 1000 may determine, based on the voice characteristic data, whether the voice signal is the voice uttered from the user or the voice output from the sound output device 200 by using the data recognition model.

In addition, the speech recognition device 1000 may determine whether the voice signal is the voice uttered from the user or the voice output from the external device, taking into account at least one piece of information included in the voice characteristic data that is generated according to the voice signal analysis illustrated with reference to FIGS. 5 to 9 and FIGS. 11 to 15 that will be described later.

FIGS. 9 and 10 show an embodiment of the present disclosure, and are not limited thereto.

Figure 11:
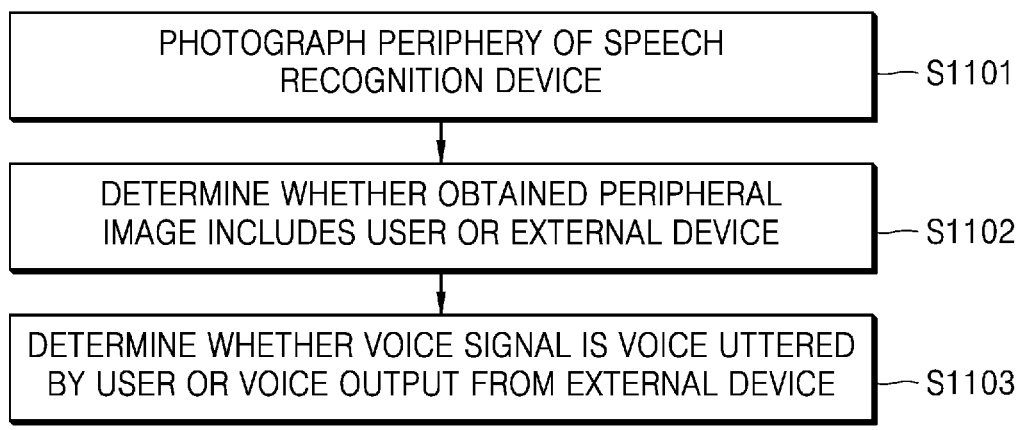
FIG. 11 is a flowchart illustrating an example of distinguishing a user's voice from a voice of an external device by using a peripheral image, according to an embodiment.

FIG. 11 is a flowchart illustrating an example of distinguishing a user's voice from a voice of an external device by using a peripheral image, according to an embodiment. FIG. 12 is a diagram illustrating an example of distinguishing a user's voice from a voice of an external device by using a peripheral image, according to an embodiment. The flowchart of FIG. 11 will be described with reference to FIG. 12.

In operation S1101 of FIG. 11, the speech recognition device 1000 may obtain an image of a peripheral area of the speech recognition device 1000.

According to an embodiment, the speech recognition device 1000 may include a camera 1610 (see FIG. 17; hereinafter, referred to as the camera 1610). The speech recognition device 1000 may obtain an image of a peripheral area of the speech recognition device 1000 by using the camera 1610.

In operation S1102, the speech recognition device 1000 may determine whether an obtained peripheral image includes a user or an external device.

Referring to FIG. 12, for example, the peripheral image obtained by the speech recognition device 1000 may include the user 10 or the sound output device 200 (e.g., a TV).

In operation S1103, the speech recognition device 1000 may determine whether the voice signal is uttered by the user or output from an external device.

Referring to FIG. 12, for example, when it is determined that the sound output device 200 is included in the obtained image, the speech recognition device 1000 may determine that the voice signal is likely to be the voice output from the sound output device 200. Alternatively, when it is determined that the obtained image includes the user 10, the speech recognition device 1000 may determine that the voice signal is likely to be the voice uttered directly by the user 10.

According to an embodiment, the speech recognition device 1000 may determine whether the voice signal is the voice uttered by the user or the voice output from the sound output device 200, by analyzing the image including the periphery of the speech recognition device 1000 by using the data recognition model based on the neural network.

In addition, the speech recognition device 1000 may determine whether the voice signal is the voice uttered from the user or the voice output from the external device, taking into account at least one piece of information included in the voice characteristic data that is generated according to the voice signal analysis illustrated with reference to FIGS. 5 to 11 and FIGS. 13 to 15 that will be described later.

FIGS. 11 and 12 show an embodiment of the present disclosure, and are not limited thereto.

Figure 13:
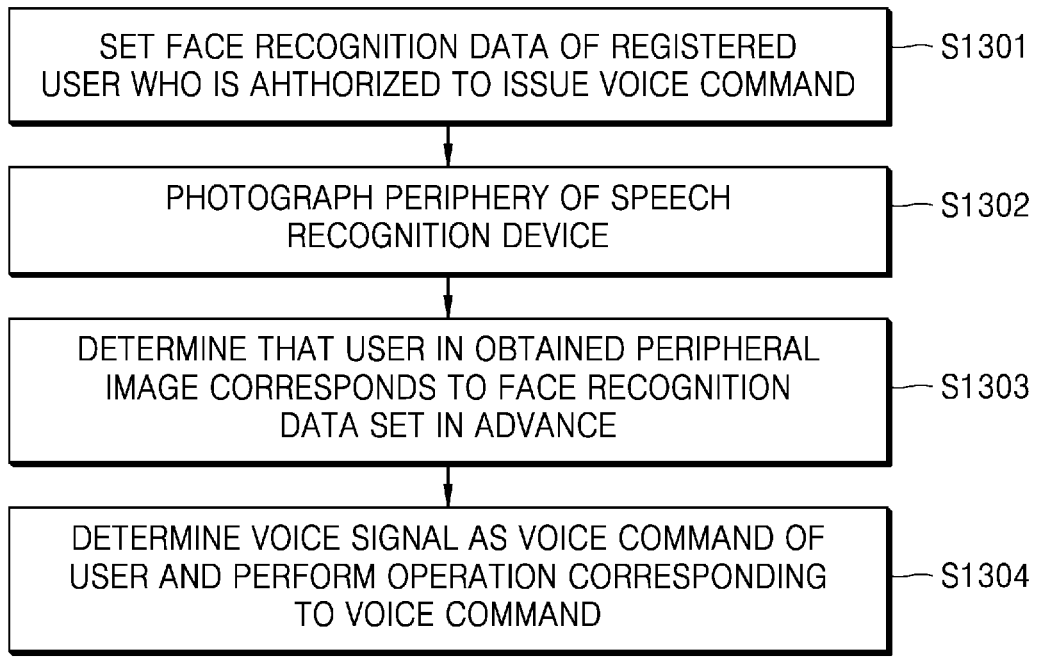
FIG. 13 is a flowchart illustrating an example of identifying a user to whom a voice command authority has been granted, according to an embodiment.
Figure 14:
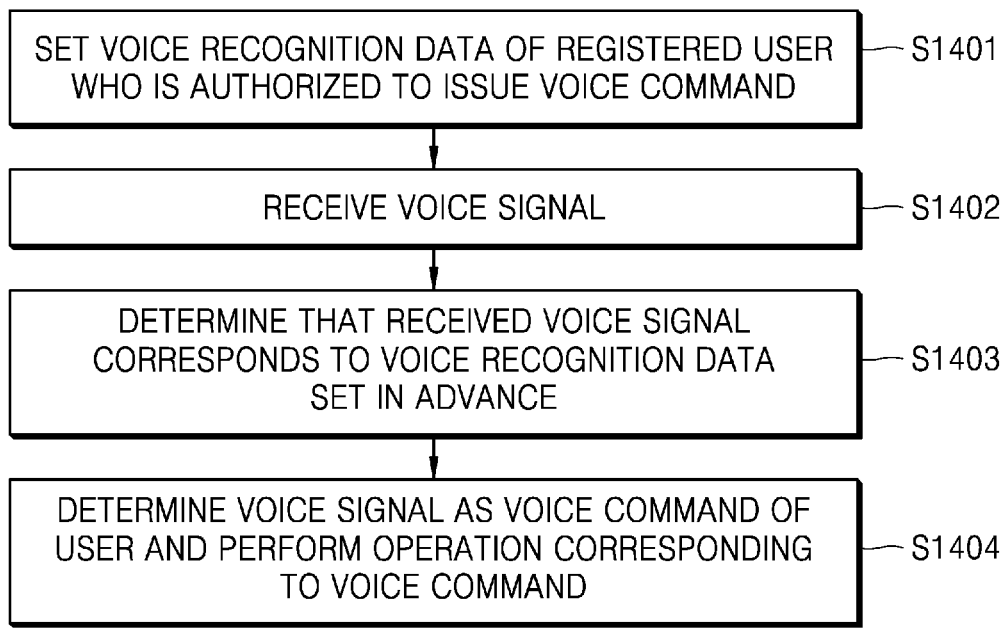
FIG. 14 is a flowchart illustrating an example of identifying a user to whom a voice command authority has been granted, according to another embodiment.
Figure 15:
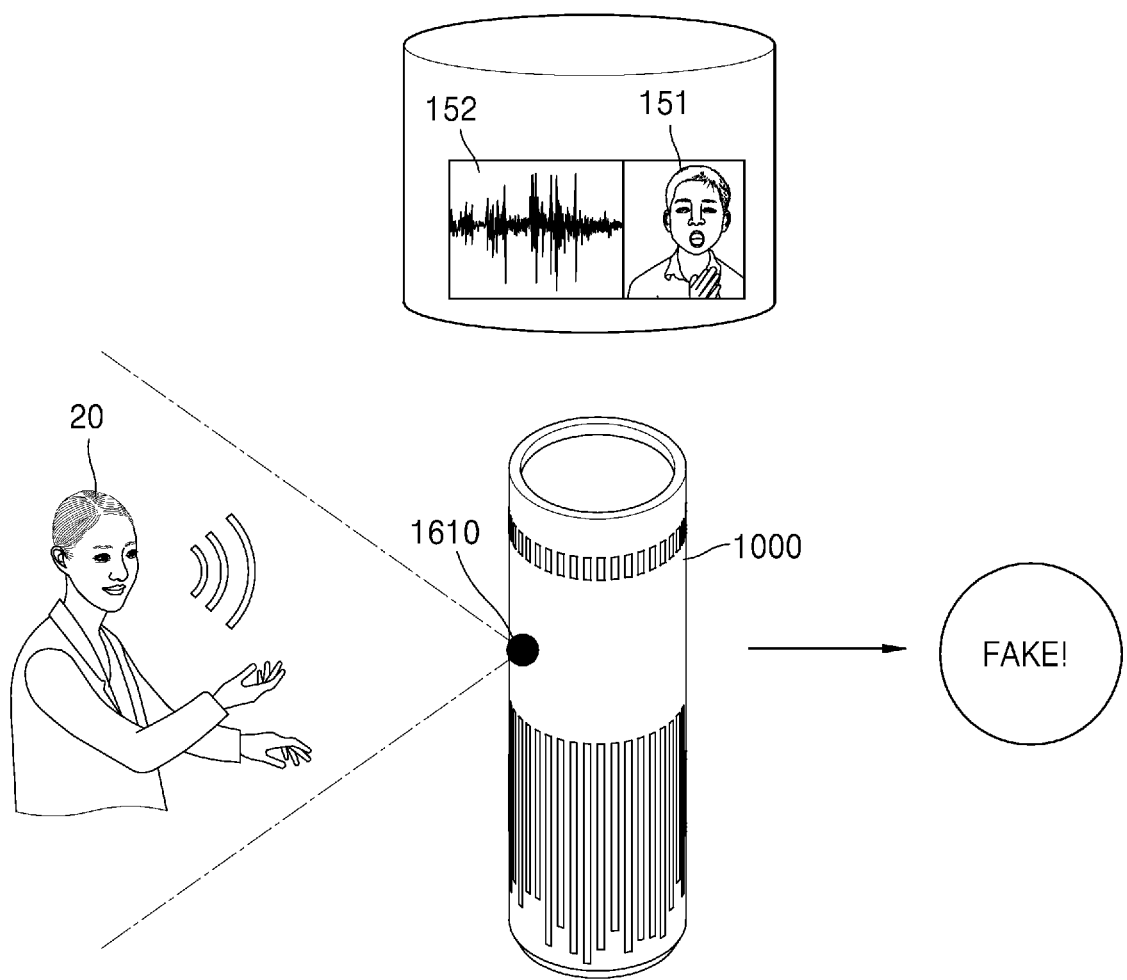
FIG. 15 is a diagram illustrating an example of identifying a user to whom a voice command authority has been granted, according to an embodiment.

FIG. 13 is a flowchart illustrating an example of identifying a user to whom a voice command authority has been granted, according to an embodiment. FIG. 14 is a flowchart illustrating an example of identifying a user who is authorized to issue a voice command, according to another embodiment. FIG. 15 is a diagram illustrating an example of identifying a user who is authorized to issue a voice command, according to an embodiment. The flowcharts of FIG. 13 and FIG. 14 will be described with reference to FIG. 15.

According to an embodiment, the speech recognition device 1000 may perform the operation corresponding to the voice command, only with respect to the voice command of a user who is registered to allow to issue the voice command.

FIG. 13 shows an example, in which a voice command of a user authorized to issue a voice command is executed by recognizing a user's face.

In operation S1301 of FIG. 13, the speech recognition device 1000 may set in advance face recognition data of a registered user who is authorized to issue the voice command.

Figure 17:
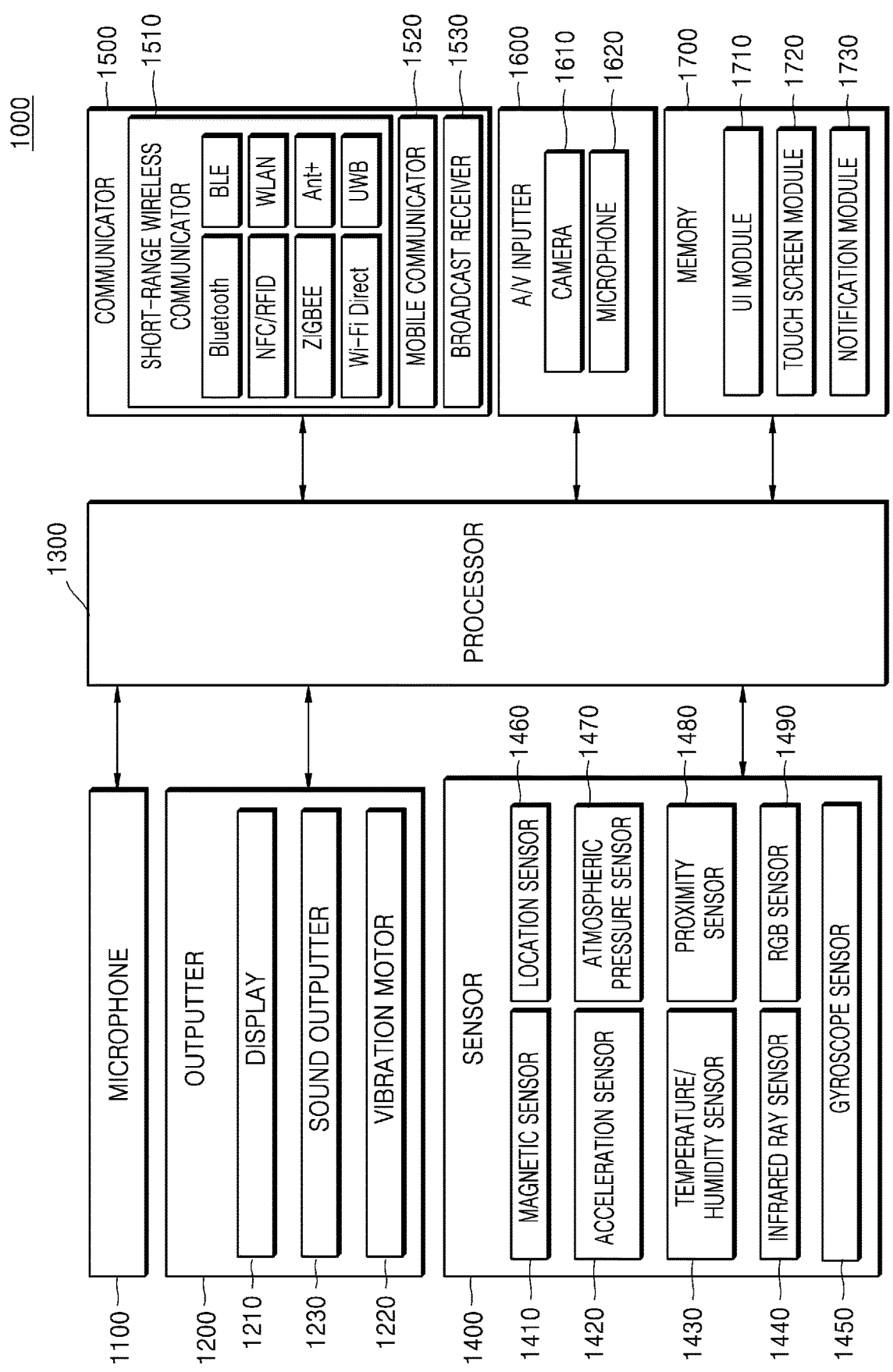
FIG. 17 is a detailed block diagram of a speech recognition device according to an embodiment.

Referring to FIG. 15, for example, the speech recognition device 1000 may store face recognition data 151 of the registered user authorized to issue the voice command in a memory 1700 (see FIG. 17).

In operation S1302, the speech recognition device 1000 may obtain an image of a peripheral area of the speech recognition device 1000.

Referring to FIG. 15, for example, the speech recognition device 1000 may include the camera 1610 (see FIG. 17). The speech recognition device 1000 may obtain an image of a peripheral area by using the camera 1610.

In operation S1303, the speech recognition device 1000 may determine that the user in the obtained peripheral image corresponds to the face recognition data set in advance.

Referring to FIG. 15, for example, the speech recognition device 1000 may recognize a face of a user 20 included in the obtained image and determine whether the face corresponds to the face recognition data 151 set in advance.

According to an embodiment, the speech recognition device 1000 may recognize the user's face included in the image and identify whether the user face corresponds to face recognition information of the registered user stored in the memory 1700, by using the data recognition model based on the neural network.

In operation S1304, the speech recognition device 1000 may determine the voice signal as the voice command of the user and perform an operation corresponding to the voice command.

According to an embodiment, when it is determined that the user face included in the image corresponds to the face of the user having the authority to issue a voice command set in advance, the speech recognition device 1000 may analyze the meaning of the voice signal and perform an operation according to the voice command.

In addition, referring to FIG. 15, for example, when it is determined that the recognized face of the user does not correspond to the face of the user having the authority to issue a voice command set in advance, the speech recognition device 1000 may not determine the voice signal as a voice command and filter the voice signal.

FIG. 14 shows an example, in which a voice command of a user authorized to issue a voice command is executed by recognizing a user's voice.

In operation S1401 of FIG. 14, the speech recognition device 1000 may set in advance voice recognition data of a registered user who is authorized to issue the voice command.

Referring to FIG. 15, for example, the speech recognition device 1000 may store voice recognition data 152 of the registered user authorized to issue the voice command in the memory 1700 (see FIG. 17).

In operation S1402, the speech recognition device 1000 may receive a voice signal.

Referring to FIG. 15, for example, the speech recognition device 1000 may receive the voice signal of the user 20 via the microphone 1620 (see FIG. 17).

In operation S1403, the speech recognition device 1000 may determine that the voice signal corresponds to the voice recognition data set in advance.

Referring to FIG. 15, for example, the speech recognition device 1000 may determine whether the voice of the user 20 corresponds to the voice recognition data 152 set in advance, by recognizing the voice.

According to an embodiment, the speech recognition device 1000 may recognize the voice of the user and determine whether the voice corresponds to the voice recognition information of the registered user stored in advance in the memory 1700, by using the data recognition model based on the neural network.

In operation S1404, the speech recognition device 1000 may determine the voice signal as the voice command of the user and perform an operation corresponding to the voice command.

According to an embodiment, when it is determined that the recognized voice of the user corresponds to the voice of the user having the authority to issue a voice command set in advance, the speech recognition device 1000 may analyze the meaning of the voice signal and perform an operation according to the voice command.

In addition, referring to FIG. 15, for example, when it is determined that the recognized voice of the user 20 does not correspond to the voice recognition data 152 of the user having the authority to issue a voice command set in advance, the speech recognition device 1000 may not determine the voice signal as a voice command and filter the voice signal.

Also, according to an embodiment, the speech recognition device 1000 may include a sound outputter 1220 (see FIG. 17). When it is determined that the recognized voice or the recognized user face does not correspond to the authorized user, the speech recognition device 1000 may output a message notifying that the user is not the user authorized to issue the voice command through the sound outputter 1220. For example, the speech recognition device 1000 may output a message "unauthorized user" through the sound outputter 1220.

FIGS. 13 to 15 show an embodiment of the present disclosure, and are not limited thereto.

Figure 16:
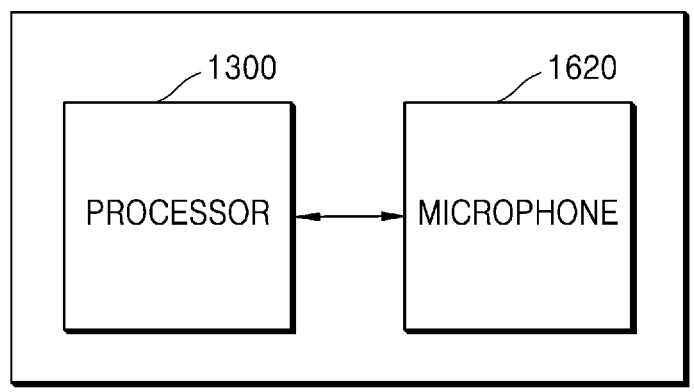
FIG. 16 is a block diagram of a speech recognition device according to an embodiment.

FIG. 16 is a block diagram of a speech recognition device according to an embodiment. FIG. 17 is a detailed block diagram of a speech recognition device according to an embodiment.

As shown in FIG. 16, the speech recognition device 1000 according to one or more embodiments may include the microphone 1620 and the processor 1300. However, not all the elements shown in FIG. 16 are the essential elements of the speech recognition device 1000. The speech recognition device 1000 may be embodied with more elements than the shown elements of FIG. 16 or may be embodied with fewer elements than the shown elements of FIG. 16.

For example, as shown in FIG. 17, the speech recognition device 1000 according to one or more embodiments may further include a user inputter 1100, an outputter 1200, a sensor 1400, a communicator 1500, an A/V inputter 1600, and the memory 1700, in addition to the microphone 1620 and the processor 1300.

The user inputter 1100 is a unit through which data for controlling the speech recognition device 1000 is input by the user. For example, the user inputter 1100 may include, but is not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like. In addition, the user inputter 1100 may be connected to the microphone 1620 to receive a voice input for controlling the speech recognition device 1000.

The outputter 1200 may output an audio signal, a video signal, or a vibration signal, and may include a display 1210, the sound outputter 1220, and a vibration motor 1230.

The display 1210 is configured to display and output information processed by the speech recognition device 1000. For example, the display 1210 may be configured to display information about a voice command of a user recognized by the speech recognition device 1000, or information about an operation execution result according to a voice command.

In addition, when the display 1210 and a touch pad are configured as a touch screen in a layered structure, the display 1210 may be used as an input device, in addition to as an output device. The display 1210 may include at least one of a liquid crystal display, a thin film transistor-liquid crystal display, an organic light-emitting diode display, a flexible display, a three-dimensional (3D) display, or an electrophoretic display.

Also, the display 1210 may include a light-emitting device (not shown). The light-emitting device (not shown) may include, for example, a light-emitting diode and a display panel, and is not limited thereto.

The sound outputter 1220 outputs sound data transmitted from the communicator 1500 or stored in the memory 1700. The vibration motor 1230 may output a vibration signal.

According to an embodiment, the sound outputter 1220 may output information about the operation execution result according to the voice command.

Also, according to an embodiment, the sound outputter 1220 may output a message expressing that the voice is not the voice of the authorized user.

The processor 1300 controls overall operations of the speech recognition device 1000. For example, the processor 1300 may execute programs stored in the memory 1700 to control the user inputter 1100, the outputter 1200, the sensor 1400, the communicator 1500, the A/V inputter 1600, etc. The processor 1300 may control the operations of the speech recognition device 1000 in order to perform the functions of the speech recognition device 1000 illustrated in FIGS. 1 to 15.

In detail, the processor 1300 may receive a voice signal through the microphone 1620.

Also, the processor 1300 may generate the voice characteristic data by analyzing the voice signal by using the data recognition model based on the neural network and may determine whether the voice signal is the voice uttered from the user or the voice output from an external device based on the voice characteristic data.

In addition, the processor 1300 may determine the voice signal as a voice command of the user and perform an operation corresponding to the voice command, because the voice signal is determined as the voice uttered by the user.

In addition, the processor 1300 may filter the voice signal, when the voice signal is determined as the voice output from the external device.

In addition, the processor 1300 may generate voice characteristic data by analyzing whether the voice signal is reconstructed from a compressed voice signal.

In addition, the processor 1300 may generate the voice characteristic data by analyzing whether electrical noise is included in the voice signal.

In addition, the processor 1300 may generate the voice characteristic data by analyzing an output location of the voice signal.

In addition, the processor 1300 may generate the voice characteristic data by setting at least one output location of the voice signal output from the external device in advance and by determining whether the output location of the received voice signal corresponds to the output location set in advance.

In addition, the processor 1300 may generate the voice characteristic data by determining the number of output locations from which the received voice signal is output.

In addition, the processor 1300 may obtain a peripheral image of the speech recognition device 1000 by using the camera 1610, and may determine whether the voice signal is the voice uttered from the user or the voice output from the external device 200 based on whether the obtained image includes the user or the external device 200.

In addition, the processor 1300 may set in advance face recognition data of the registered user who is authorized to issue the voice command, and may determine the voice signal as the voice command of the user and perform an operation corresponding to the voice command, when it is determined that the user in the obtained peripheral image corresponds to the face recognition data set in advance.

In addition, the processor 1300 may set in advance voice recognition data of the registered user who is authorized to issue the voice command, and may determine the voice signal as the voice command of the user and perform an operation corresponding to the voice command, when it is determined that the received voice signal corresponds to the voice recognition data set in advance.

The sensor 1400 senses a status of the speech recognition device 1000 or a peripheral status of the speech recognition device 1000, and may transmit sensed information to the processor 1300.

The sensor 1400 may include, but is not limited to, at least one of a magnetic sensor 1410, an acceleration sensor 1420, a temperature/humidity sensor 1430, an infrared ray sensor 1440, a gyroscope sensor 1450, a location sensor (e.g., a global positioning system (GPS)) 1460, an illuminance sensor 1495, a proximity sensor 1480, or an RGB sensor 1490. Because one or ordinary skill in the art may intuitively infer functions of the sensors from the sensors' names, detailed descriptions thereof are omitted.

The communicator 1500 may include one or more elements that allow the speech recognition device 1000 to communicate with the outside. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth low energy (BLE) communicator, a near field communication unit, a WLAN (Wi-Fi) communicator, a ZigBee communicator, an infrared-ray data association (IrDA) communicator, a Wi-Fi direct (WFD) communicator, an ultra wideband (UWB) communicator, an Ant+ communicator, etc.

The mobile communicator 1520 may transmit/receive a wireless signal to/from at least one of a base station, an external terminal, or a server on a mobile communication network. Here, the wireless signal may include a voice call signal, a video call signal, or various types of data according to transmission/reception of texts/multimedia messages.

The broadcast receiver 1530 receives a broadcast signal and/or broadcast-related information from outside via a broadcast channel. The broadcast channel may include satellite channels and terrestrial channels. In some embodiments of the disclosure, the speech recognition device 1000 may not include the broadcast receiver 1530.

The A/V input unit 1600 is for inputting an audio signal or a video signal, and may include the camera 1610, the microphone 1620, etc.

The camera 1610 may obtain image frames such as a still image, a video, etc. by using an image sensor in a video call mode or a photographing mode. An image captured by the image sensor may be processed by the processor 1300 or an additional image processor (not shown).

The image frame processed by the camera 1610 may be stored in the memory 1700 or may be transmitted to the outside via the communicator 1500. Two or more cameras 1610 may be provided according to a configuration aspect of the terminal.

The microphone 1620 receives a sound signal from outside and processes the sound signal as electrical voice data. For example, the microphone 1620 may receive a sound signal from an external device or a narrator. The microphone 1620 may use various noise cancelling algorithms for cancelling noise generated when receiving the sound signal from the outside.

The memory 1700 may store programs for processing and controlling the processor 1300, and may store data input to or output from the speech recognition device 1000.

The memory 1700 may include a storage medium of at least one type of a flash memory type, a hard disk type, a multimedia card micro type, a card type memory (e.g., an SD or XD memory, etc.), random access memory (RAM), static RAM (SRAM), read-only memory (ROM), electrically erasable programmable ROM (EEPROM), programmable (PROM), a magnetic memory, a magnetic disk, or an optical disk.

The programs stored in the memory 1700 may be classified as a plurality of modules according to functions thereof, for example, a UI module 1710, a touch screen module 1720, a notification module 1730, an image filter module 1740, etc.

The memory 1700 may store a registered direction, a shadow direction, information about a home device 200, information about priority order, place information, etc.

According to an embodiment, the memory 1700 may store face recognition data, voice recognition data, etc. of a registered user authorized to issue a voice command.

Also, according to an embodiment, the memory 1700 may store at least one output location, direction, etc. of a voice signal output from the external device 200.

The UI module 1710 may provide specified UI, GUI, etc. connected to the speech recognition device 1000 for each application. The touch screen module 1720 senses a touch gesture of the user on the touch screen, and may transmit information about the touch gesture to the processor 1300.

The touch screen module 1720 according to some embodiments may sense and analyze a touch code. The touch screen module 1720 may be configured as additional hardware including a controller.

The notification module 1730 may generate a signal for notifying occurrence of an event in the speech recognition device 1000. Examples of an event occurring in the speech recognition device 1000 may include schedule notification, notification of related information such as completion of a voice command, a key signal input, etc. The notification module 1730 may output a notification signal as a video signal through the display 1210, may output a notification signal as an audio signal through the sound outputter 1220, or may output the notification as a vibration signal through the vibration motor 1230.

The external device 200 may also include elements illustrated in FIGS. 16 and 17.

Figure 18:
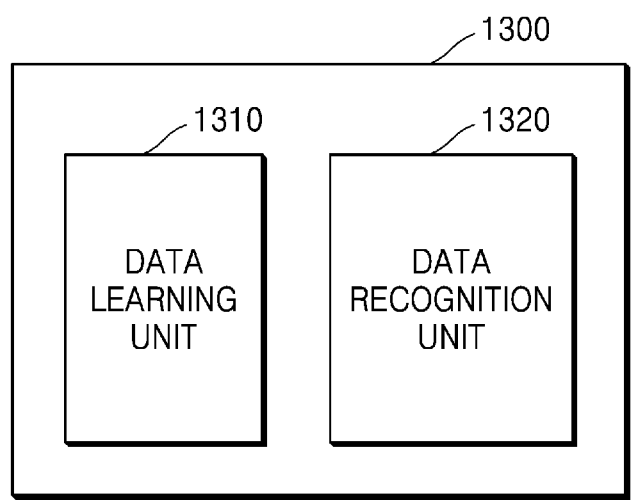
FIG. 18 is a block diagram of a processor according to an embodiment.

FIG. 18 is a block diagram of the processor 1300 according to an embodiment.

Referring to FIG. 18, the processor 1300 according to the embodiment of the disclosure may include a data learning unit 1310 and a data recognition unit 1320.

The data learning unit 1310 may learn a criterion for determining a situation. The data learning unit 1310 may learn a criterion about which data should be used to determine a certain situation, and how to determine the situation by using the data. The data learning unit 1310 obtains data used in learning, and applies the obtained data to a data recognition model that will be described later to learn the criteria for determining the situation.

The data recognition unit 1320 may determine a situation based on data. The data recognition unit 1320 may recognize a situation from certain data by using a trained data recognition model. The data recognition unit 1320 obtains certain data according to a criterion set in advance through learning, and uses the data recognition model by using the obtained data as an input value to determine a certain situation based on the certain data. Also, a result value output through the data recognition model from the obtained data used as the input value may be used to update the data recognition model.

At least one of the data learning unit 1310 and the data recognition unit 1320 may be manufactured in the form of at least one hardware chip that is mounted in an electronic apparatus. For example, at least one of the data learning unit 1310 and the data recognition unit 1320 may be manufactured as a hardware chip exclusive for artificial intelligence (AI), or may be manufactured as a part of an existing universal processor (e.g., a central processing unit (CPU) or an application processor) or a graphics-only processor (e.g., graphics processing unit (GPU)) to be mounted in the various electronic apparatuses.

In this case, the data learning unit 1310 and the data recognition unit 1320 may be mounted in one electronic apparatus, or may be respectively mounted in separate electronic apparatuses. For example, one of the data learning unit 1310 and the data recognition unit 1320 may be included in an electronic apparatus and the other may be included in a server. Also, the data learning unit 1310 and the data recognition unit 1320 may communicate with each other through wires or wirelessly, so that model information established by the data learning unit 1310 may be provided to the data recognition unit 1320 and data input to the data recognition unit 1320 may be provided to the data learning unit 1310 as additional learning data.

In addition, at least one of the data learning unit 1310 and the data recognition unit 1320 may be implemented as a software module. When at least one of the data learning unit 1310 and the data recognition unit 1320 is implemented as a software module (or a programming module including instructions), the software module may be stored in a non-transitory computer-readable recording medium. In addition, in this case, the at least one software module may be provided by an operating system (OS), or a predetermined application. Otherwise, a part of the at least one software module is provided by the OS or the remaining part of the at least one software module may be provided by a predetermined application.

Figure 19:
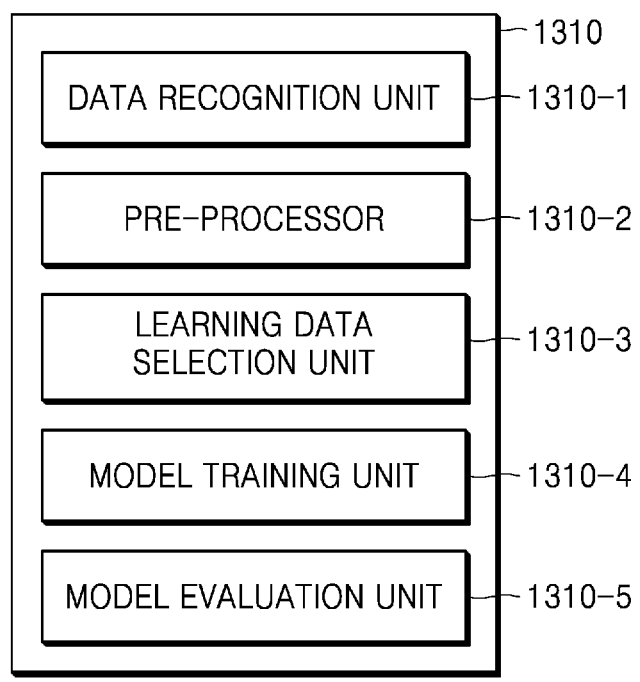
FIG. 19 is a block diagram of a data learning unit according to an embodiment.

FIG. 19 is a block diagram of a data learning unit according to an embodiment.

Referring to FIG. 19, the data learning unit 1310 according to some embodiments of the disclosure may include a data obtainer 1310-1, a pre-processor 1310-2, a learning data selection unit 1310-3, a model training unit 1310-4, and a model evaluation unit 1310-5.

The data obtainer 1310-1 may obtain data required to determine a situation. The data obtainer 1310-1 may obtain data required for training for the determination of the situation.

For example, the data obtainer 1310-1 may receive an input of data through an input device (e.g., a microphone, a camera, sensor, etc.) of an electronic apparatus. Alternatively, the data obtainer 1310-1 may obtain data through an external device communicating with the electronic apparatus. The data obtainer 1310-1 may receive data from a server.

According to an embodiment, the data obtainer 1310-1 may obtain a video frame or a voice signal.

For example, the data obtainer 1310-1 may receive an input of a peripheral image of the speech recognition device 1000. The peripheral image may include a plurality of images (or frames). For example, the data obtainer 1310-1 may receive an input of a video through a camera of a speech recognition device including the data learning unit 1310, or an external camera (e.g., a CCTV, a black box camera, etc.) capable of communicating with the speech recognition device including the data learning unit 1300. Here, the camera may include one or more image sensors (e.g., a front sensor or a rear sensor), a lens, an image signal processor (ISP), or a flash (e.g., an LED, a xenon lamp, etc.).

In addition, according to an embodiment, the data obtainer 1310-1 may obtain a voice signal input through the microphone 1620 (see FIG. 17).

The pre-processor 1310-2 may pre-process the obtained data so that the obtained data may be used in training for the determination of the situation. The pre-processor 1310-2 may process the obtained data in a preset format, so that the model training unit 1310-4 that will be described later may use the data obtained for training for the determination of the situation. For example, the pre-processor 1310-2 may generate one combined image by at least partially overlapping the plurality of images, based on a common area included in each of the plurality of images (or frames) configuring at least a part of the input video. In this case, a plurality of combined images may be generated from one video. The common area may be an area including the same or similar common object (e.g., objects, plants or animals, persons, etc.) in each of the plurality of images. Alternatively, the common area may be areas having the same or similar colors, shadows, RGB values, or CMYK values respectively in the plurality of images.

The learning data selection unit 1310-3 may select data necessary for the learning, from the pre-processed data. The selected data may be provided to the model training unit

1310-4. The learning data selection unit 1310-3 may select data required for the training from among the pre-processed data, according to the criterion set in advance for determining the situation. Also, the learning data selection unit 1310-3 may select data according to a criterion set in advance through the training performed by the model training unit 1310-4 that will be described later.

For example, voice characteristic data that is generated by analyzing the voice signal may be selected. Also, for example, image data obtained by photographing the periphery of the speech recognition device 1000 may be selected.

The model training unit 1310-4 may learn a criterion about how to determine the situation based on the learning data. Also, the model training unit 1310-4 may learn a criterion about which learning data has to be used to determine the situation.

According to an embodiment, the model training unit 1310-4 may learn a criterion for determining whether the voice signal is the voice uttered from the user or the voice output from the external device based on the voice characteristic data.

Also, the model training unit 1310-4 may train a data recognition model used to determine the situation, by using the learning data. In this case, the data recognition model may be established in advance. For example, the data recognition model may be established in advance by receiving basic learning data (e.g., sample images, sample voice signals, etc.).

The data recognition model may be established taking into account an application field of the recognition model, purpose of the learning, a computer performance of the device, etc. The data recognition model may be, for example, based on a neural network. For example, a model such as a deep neural network (DNN), a recurrent neural network (RNN), or a bidirectional recurrent deep neural network (BRDNN) may be used as the data recognition model, but is not limited thereto.

According to one or more embodiments, when there are a plurality of data recognition models established in advance, the model training unit 1310-4 may determine a data recognition model, in which input learning data and basic learning data are highly related to each other, as the data recognition model to learn. In this case, the basic learning data may be classified in advance according to data types, and the data recognition model may be established in advance for each data type. For example, the basic learning data may be classified in advance based various criteria such as a region where the learning data is generated, a time of generating the learning data, a size of the learning data, genre of the learning data, a producer of the learning data, kinds of objects included in the learning data, etc.

Also, the model training unit 1310-4 may train the data recognition model by using a learning algorithm including, for example, an error back-propagation method or a gradient descent method.

Also, the model training unit 1310-4 may train the data recognition model through, for example, supervised learning using the learning data as an input value. In addition, the model training unit 1310-4 may train the data recognition model through unsupervised learning which discovers a criterion for determining the situation by learning types of data required for determining the situation without a guidance. Also, the model training unit 1310-4 may train the data recognition model through, for example, reinforcement learning which uses feedback as to whether the result of determining the situation according to the training is correct.

Also, when the data recognition model is trained, the model training unit 1310-4 may store the trained data recognition model. In this case, the model training unit 1310-4 may store the trained data recognition model in a memory of the speech recognition device including the data recognition unit 1320. Alternatively, the model training unit 1310-4 may store the trained data recognition model in a memory of the speech recognition device including the data recognition unit 1320 that will be described later. Alternatively, the model training unit 1310-4 may store the trained data recognition model in a memory of a server that is connected to the speech recognition device through a wired network or a wireless network.

In this case, the memory storing the trained data recognition model may also store, for example, commands or data related to at least one other element of the speech recognition device. Also, the memory may store software and/or programs. The program may include, for example, a kernel, middleware, an application programming interface (API), and/or an application program (or "application"), etc.

The model evaluation unit 1310-5 may input evaluation data to the data recognition model, and when a recognition result output from the evaluation data does not satisfy a predetermined criterion, the model evaluation unit 1310-5 may allow the model learning unit 1310-4 to train again. In this case, the evaluation data may be set in advance to evaluate the data recognition model.

For example, the model evaluation unit 1310-5 may evaluate that the predetermined criterion is not satisfied when, from among the recognition results of the trained data recognition model with respect to the evaluation data, the number or a ratio of the evaluation data, of which recognition results are not accurate, exceeds a preset threshold value. For example, in a case in which the predetermined criterion is defined as 2% ratio, when the trained data recognition model outputs wrong recognition results with respect to 20 or greater pieces of evaluation data from among a total of 1000 pieces of evaluation data, the model evaluation unit 1310-5 may evaluate that the trained data recognition model is not adequate.

In addition, when there are a plurality of trained data recognition models, the model evaluation unit 1310-5 may evaluate whether the predetermined criterion is satisfied with respect to each of the trained data recognition models, and may determine the model satisfying the predetermined criterion as a final data recognition model. In this case, when there are a plurality of models satisfying the predetermined criterion, the model evaluation unit 1310-5 may determine one model or a predetermined number of models as the final data recognition model, in an order of high evaluation score.

At least one of the data obtainer 1310-1, the pre-processor 1310-2, the learning data selection unit 1310-3, the model training unit 1310-4, or the model evaluation unit 1310-5 in the data learning unit 1310 may be manufactured as at least one hardware chip and mounted in the speech recognition device. For example, at least one of the data obtainer 1310-1, the pre-processor 1310-2, the learning data selection unit 1310-3, the model training unit 1310-4, or the model evaluation unit 1310-5 may be manufactured as a hardware chip exclusive for the AI, or may be manufactured as a part of an existing universal processor (e.g., a CPU or an application processor) or a graphics-only processor (e.g., a GPU) to be mounted in various electronic apparatuses described above.

Also, the data obtainer 1310-1, the pre-processor 1310-2, the learning data selection unit 1310-3, the model training unit 1310-4, and the model evaluation unit 1310-5 may be provided in one electronic apparatus, or may be respectively provided in separate electronic apparatuses. For example, some of the data obtainer 1310-1, the pre-processor 1310-2, the learning data selection unit 1310-3, the model training unit 1310-4, and the model evaluation unit 1310-5 may be included in the speech recognition device, and some others may be included in a server.

Also, at least one of the data obtainer 1310-1, the pre-processor 1310-2, the learning data selection unit 1310-3, the model training unit 1310-4, or the model evaluation unit 1310-5 may be implemented as a software module. When at least one of the data obtainer 1310-1, the pre-processor 1310-2, the learning data selection unit 1310-3, the model training unit 1310-4, or the model evaluation unit 1310-5 is implemented as a software module (or a program module including instructions), the software module may be stored in a non-transitory computer-readable recording medium. In addition, in this case, the at least one software module may be provided by an operating system (OS), or a predetermined application. Otherwise, a part of the at least one software module is provided by the OS or the remaining part of the at least one software module may be provided by a predetermined application.

Figure 20:
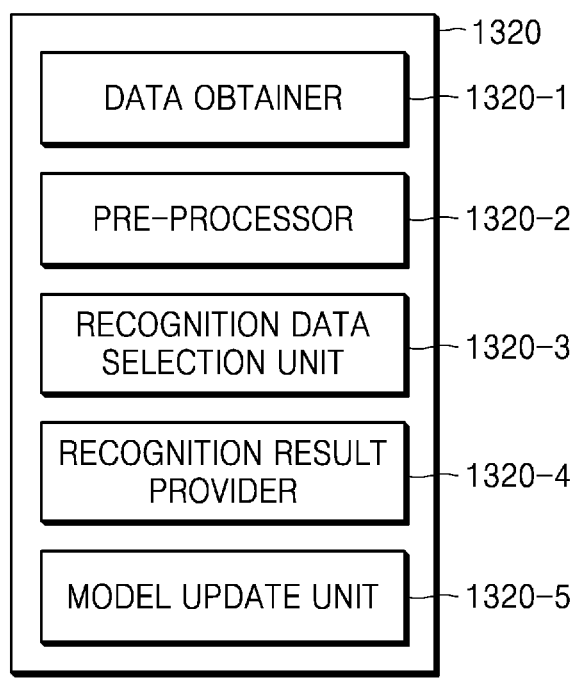
FIG. 20 is a block diagram of a data recognition unit according to an embodiment.

FIG. 20 is a block diagram of a data recognition unit according to an embodiment.

Referring to FIG. 20, the data recognition unit 1320 according to one or more embodiments may include a data obtainer 1320-1, a pre-processor 1320-2, a recognition data selection unit 1320-3, a recognition result provider 1320-4, and a model update unit 1320-5.

The data obtainer 1320-1 may obtain data required to determine the situation, and the pre-processor 1320-2 may pre-process the obtained data to be used to determine the situation. The pre-processor 1310-2 may process the obtained data in a preset format, so that the recognition result provider 1320-4 that will be described later may use the obtained data for determining the situation.

The recognition data selection unit 1320-3 may select data necessary for determining of the situation, from the pre-processed data. Selected data may be provided to the recognition result provider 1320-4. The recognition data selection unit 1320-3 may select some or all the pre-processed data, according to the criterion set in advance for determining the situation. Also, the recognition data selection unit 1320-3 may select data according to a criterion set in advance through the training performed by the model training unit 1310-4 that will be described later.

The recognition result provider 1320-4 may determine the situation by applying the selected data to the data recognition model. The recognition result provider 1320-4 may provide a recognition result according to the purpose of recognizing the data. The recognition result provider 1320-4 may apply the selected data to the data recognition model by using the data selected by the recognition data selection unit 1320-3 as an input value. Also, the recognition result may be determined by the data recognition model.

According to an embodiment, whether the recognized voice signal is the voice uttered from the user or the voice of the registered user authorized to issue the voice command may be provided in the form of text, voice, video, image, or instructions (e.g., application execution instructions, module function execution instructions, etc.).

Also, according to an embodiment, the result of performing the operation according to the recognized voice command may be provided in the form of the text, voice, video, image, or instructions (e.g., application execution instructions, module function execution instructions, etc.).

The model update unit 1320-5 may update the data recognition model based on the evaluation on the recognition result provided by the recognition result provider 1320-4. For example, the model update unit 1320-5 provides the recognition results from the recognition result provider 1320-4 to the model training unit 1310-4, so that the model training unit 1310-4 may update the data recognition model.

In addition, at least one of the data obtainer 1320-1, the pre-processor 1320-2, the recognition data selection unit 1320-3, the recognition result provider 1320-4, or the model update unit 1320-5 in the data recognition unit 1320 may be manufactured as at least one hardware chip and mounted in the electronic apparatus. For example, at least one of the data obtainer 1320-1, the pre-processor 1320-2, the recognition data selection unit 1320-3, the recognition result provider 1320-4, or the model update unit 1320-5 may be manufactured as a hardware chip exclusive for the AI, or may be manufactured as a part of an existing universal processor (e.g., a CPU or an application processor) or a graphics-only processor (e.g., a GPU) to be mounted in various electronic apparatuses described above.

Also, the data obtainer 1320-1, the pre-processor 1320-2, the recognition data selection unit 1320-3, the recognition result provider 1320-4, and the model update unit 1320-5 may be provided in one electronic apparatus, or may be respectively provided in separate electronic apparatuses. For example, some of the data obtainer 1320-1, the pre-processor 1320-2, the recognition data selection unit 1320-3, the recognition result provider 1320-4, and the model update unit 1320-5 may be included in the electronic apparatus, and some others may be included in a server.

Also, at least one of the data obtainer 1320-1, the pre-processor 1320-2, the recognition data selection unit 1320-3, the recognition result provider 1320-4, or the model update unit 1320-5 may be implemented as a software module. When at least one of the data obtainer 1320-1, the pre-processor 1320-2, the recognition data selection unit 1320-3, the recognition result provider 1320-4, or the model update unit 1320-5 is implemented as a software module (or a program module including instructions), the software module may be stored in a non-transitory computer-readable recording medium. In addition, in this case, the at least one software module may be provided by an operating system (OS), or a predetermined application. Otherwise, a part of the at least one software module is provided by the OS or the remaining part of the at least one software module may be provided by a predetermined application.

Figure 21:
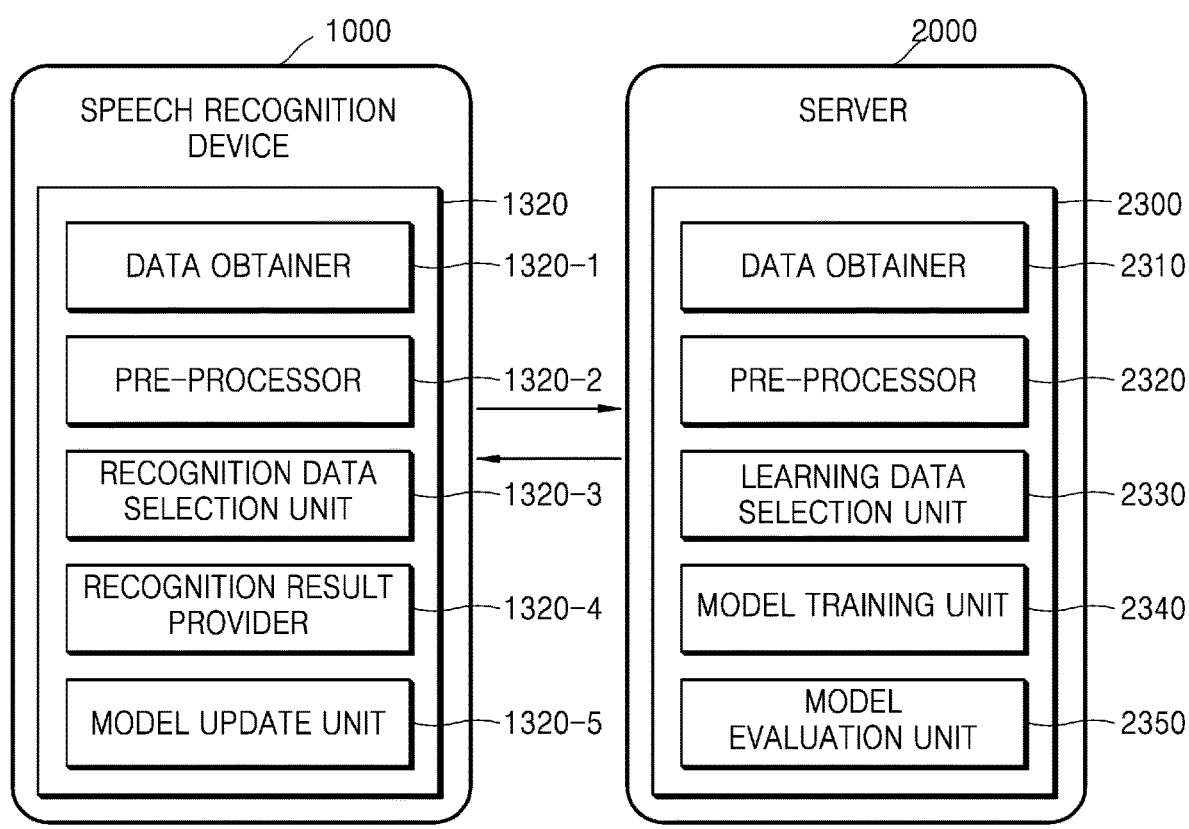
FIG. 21 is a diagram of an example, in which a speech recognition device according to an embodiment and a server learn and recognize data in linkage with each other.

FIG. 21 is a diagram of an example, in which a speech recognition device according to an embodiment and a server learn and recognize data in linkage with each other.

FIG. 21 is a diagram of an example, in which a speech recognition device 1000 according to an embodiment and a server 2000 learn and recognize data in linkage with each other.

Referring to FIG. 21, the server 2000 may learn a criterion for determining the situation, and the speech recognition device 1000 may determine the situation based on the learning result of the server 2000.

In this case, a model training unit 2340 of the server 2000 may perform functions of the data learning unit 1310 shown in FIG. 19. The model training unit 2340 of the server 2000 may learn criteria about which data should be used to determine a certain situation, and how to determine the situation by using the data. The model training unit 2340 obtains data used in learning, and applies the obtained data to a data recognition model that will be described later to learn the criteria for determining the situation.

Also, the recognition result provider 1320-4 of the speech recognition device 1000 may determine the situation by applying the data selected by the recognition data selection unit 1320-3 to the data recognition model generated by the server 2000. For example, the recognition result provider 1320-4 may transfer the data selected by the recognition data selection unit 1320-3 to the server 2000, and may request the server 2000 to apply the data selected by the recognition data selection unit 1320-3 to the recognition model and to determine the situation. Also, the recognition result provider 1320-4 may receive from the server 2000 information about the situation determined by the server 2000.

For example, the speech recognition device 1000 transfers the voice characteristic data to the server 2000 and may request the server 2000 to apply the voice characteristic data to the data recognition model and to determine whether the voice signal is the voice uttered from the user or the voice output from the external device. Also, the speech recognition device 1000 may receive from the server 2000 the determination on whether the voice signal is the voice uttered from the user or the voice output from the external device determined by the server 2000.

Alternatively, the recognition result provider 1320-4 of the speech recognition device 1000 may receive the recognition model generated by the server 2000 from the server 2000, and may determine the situation by using the recognition model. In this case, the recognition result provider 1320-4 of the speech recognition device 1000 may determine the situation by applying the data selected by the recognition data selection unit 1320-3 to the data recognition model received from the server 2000.

For example, the speech recognition device 1000 may apply the voice characteristic data to the data recognition model received from the server 2000, and learn whether the voice signal is the voice uttered from the user or the voice output from the external device.

Apparatuses according to the embodiments may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program commands or computer-readable code executable on a processor on a computer-readable recording medium. Examples of the computer-readable recording medium include magnetic storage media (e.g., ROM, RAM, floppy disks, hard disks, etc.), and optical recording media (e.g., CD-ROMs or Digital Versatile Discs (DVDs)). The computer-readable recording medium may also be distributed over network coupled computer systems so that the computer-readable code is stored and executed in a distributive manner. This media may be read by the computer, stored in the memory, and executed by the processor.

The present embodiments may be described in terms of functional block components and various processing steps. The functional blocks may be implemented as various numbers of hardware and/or software configurations executing certain functions. For example, the present disclosure may adopt direct circuit configurations such as a memory, processing, logic, look-up table, etc. that may perform various functions according to control of one or more microprocessors or other control devices. In a similar manner to that in which the elements of the present disclosure may be executed with software programming or software elements, the exemplary embodiments may be implemented with a scripting language or a programming language such as C, C++, Java, assembler, and the like, including various algorithms implemented by a combination of data structures, processes, routines, or other programming configurations. The functional aspects may be implemented in algorithms that are executed on one or more processors. Also, the embodiments may employ any number of techniques according to the related art for electronics configuration, signal processing and/or control, data processing, and the like. The terms "mechanism", "element", "means", and "configuration" may be widely used and are not limited to mechanical and physical configurations. The above terms may include software routines in conjunction with processors, etc.

What is claimed is:

1. A speech recognition device comprising:
a microphone;
a memory storing information about at least one pre-set output location of a voice signal from at least one external device; and
a processor configured to:
receive a voice signal through the microphone,
generate voice characteristic data by determining whether an output location of the voice signal corresponds to the at least one pre-set output location, by determining a number of output locations from which the voice signal is output using a data recognition model and by determining whether the voice signal is a reconstructed signal from a compressed signal by analyzing waveform and frequency of the voice signal based on a neural network,
based on the voice characteristic data, identify whether the voice signal is a user-spoken voice signal or a voice signal output from the at least one external device, wherein the identifying comprises determining the voice signal as more likely being a voice signal output from the at least one external device than being a user-spoken signal based on determining that the voice signal is output from a plurality of output locations, and determining the voice signal as a voice signal output from the at least one external device based on determining that the voice signal is the reconstructed signal from the compressed signal,
based on the voice signal being identified as the user-spoken voice signal, identify the voice signal as a voice command and perform an operation corresponding to the voice command.

2. The speech recognition device of claim 1, wherein the processor is further configured to, based on the voice signal being determined to be the voice signal output from the external device, filter the voice signal.

3. The speech recognition device of claim 1, wherein the processor is further configured to:
pre-set voice recognition data of a registered user authorized to issue a voice command, and
based on determining that the voice signal corresponds to the pre-set voice recognition data, identify the voice signal as the voice command.

4. The speech recognition device of claim 1, wherein the processor is further configured to generate the voice characteristic data by analyzing whether the voice signal includes electrical noise.

5. An operation method of a speech recognition device, the operation method comprising:
pre-setting at least one output location of the voice signal output from at least one external device;
receiving a voice signal through a microphone of the speech recognition device;

generating voice characteristic data by determining whether an output location of the voice signal corresponds to the at least one pre-set output location, and by determining a number of output locations from which the voice signal is output using a data recognition model and by determining whether the voice signal is a reconstructed signal from a compressed signal by analyzing waveform and frequency of the voice signal based on a neural network;

based on the voice characteristic data, identify whether the voice signal is a user-spoken voice or a voice output from the at least one external device, wherein the identifying comprises determining the voice signal as more likely being a voice output from the at least one external device than being user-spoken based on determining that the voice is output from a plurality of output locations; and determining the voice signal as a voice signal output from the at least one external device based on determining that the voice signal is the reconstructed signal from the compressed signal, based on the voice signal being identified as the user-spoken voice, identifying the voice signal as a voice command and performing an operation corresponding to the voice command.

6. The operation method of claim 5, further comprising filtering the voice signal based on the voice signal being determined to be the voice output from the external device.

7. The operation method of claim 5, wherein the generating of the voice characteristic data comprises generating the voice characteristic data by analyzing whether the voice signal includes electrical noise.

8. A non-transitory computer-readable recording medium having recorded thereon a program which, when executed by a processor of a speech recognition device, causes the speech recognition device to perform:

pre-setting at least one output location of the voice signal output from at least one external device;

receiving a voice signal through a microphone of the speech recognition device;

generating voice characteristic data by determining whether an output location of the voice signal corresponds to the at least one pre-set output location, by determining a number of output locations from which the voice signal is output using a data recognition model and by determining whether the voice signal is a reconstructed signal from a compressed signal by analyzing waveform and frequency of the voice signal based on a neural network;

based on the voice characteristic data, identifying whether the voice signal is a user-spoken voice or a voice output from the at least one external device, wherein the identifying comprises determining the voice signal as more likely being a voice output from the at least one external device than a user-spoken voice based on determining that the voice is output from a plurality of output locations; and determining the voice signal as a voice signal output from the at least one external device based on determining that the voice signal is the reconstructed signal from the compressed signal, based on the voice signal being identified as the user-spoken voice, identifying the voice signal as a voice command and performing an operation corresponding to the voice command.

\* \* \* \* \*